(12) United States Patent
Jain et al.

(10) Patent No.: US 12,236,218 B2
(45) Date of Patent: Feb. 25, 2025

(54) SOFTWARE CODE VERIFICATION USING CALL GRAPHS FOR AUTONOMOUS SYSTEMS AND APPLICATIONS

(71) Applicant: NVIDIA Corporation, Santa Clara, CA (US)

(72) Inventors: Ashutosh Jain, Karnataka (IN); Charan Pai, Karnataka (IN); Deepak Ravi, Kerala (IN); Karthik Raghavan Ravi, Bangalore (IN); Kiran Sj, Bangalore (IN); Yogesh Kini, Karnataka (IN)

(73) Assignee: NVIDIA Corporation, Santa Clara, CA (US)

( * ) Notice: Subject to any disclaimer, the term of this patent is extended or adjusted under 35 U.S.C. 154(b) by 233 days.

(21) Appl. No.: 17/879,447

(22) Filed: Aug. 2, 2022

(65) Prior Publication Data
US 2024/0045662 A1 Feb. 8, 2024

(51) Int. Cl.
*G06F 8/41* (2018.01)

(52) U.S. Cl.
CPC .................................... *G06F 8/434* (2013.01)

(58) Field of Classification Search
None
See application file for complete search history.

(56) References Cited

U.S. PATENT DOCUMENTS

| | | | | |
|---|---|---|---|---|
| 6,173,444 B1* | 1/2001 | Archambault | .......... | G06F 8/443 717/145 |
| 7,703,087 B1* | 4/2010 | Prakash | ................ | G06F 8/4442 717/157 |
| 9,817,643 B2* | 11/2017 | He | ......................... | G06F 8/4441 |
| 9,977,758 B1* | 5/2018 | Schumacher | ....... | G06F 13/4221 |
| 10,365,905 B1* | 7/2019 | Ong | ........................ | G06F 8/433 |
| 10,782,934 B1* | 9/2020 | Chawda | .................... | G06F 8/30 |
| 10,904,291 B1* | 1/2021 | Naumann | ............... | H04L 63/20 |
| 11,467,812 B2* | 10/2022 | Tye | ........................... | G06F 8/54 |
| 11,581,875 B1* | 2/2023 | Mai | .......................... | H03K 5/01 |
| 11,768,754 B2* | 9/2023 | Zhai | .................... | G06F 11/3466 717/127 |
| 2004/0064809 A1* | 4/2004 | Liu | ........................ | G06F 8/433 717/162 |
| 2008/0127146 A1* | 5/2008 | Liao | ........................ | G06F 8/456 717/149 |
| 2010/0199264 A1* | 8/2010 | Maeda | ................ | G06F 11/3688 717/125 |

(Continued)

*Primary Examiner* — Philip Wang
(74) *Attorney, Agent, or Firm* — Taylor English Duma L.L.P.

(57) ABSTRACT

In various examples, techniques for performing software code verification are described. Systems and methods are disclosed for generating, using intermediate code and user input, a call graph that represents source code for software. For instance, the call graph represents at least functions (e.g., internal functions, external functions, etc.) associated with the software, calls (e.g., direct calls, call pointers, etc.) between the functions, and register information associated with the functions (e.g., variables used by the functions, assembly code used by the functions, etc.). The systems and methods may further use the call graph to perform software code verification by verifying rules from design specifications for the software and/or rules from various certification standards.

20 Claims, 13 Drawing Sheets

(56) References Cited

U.S. PATENT DOCUMENTS

| | | | | |
|---|---|---|---|---|
| 2014/0304687 A1* | 10/2014 | Hobbs | G06F 11/3692 | 717/126 |
| 2015/0309813 A1* | 10/2015 | Patel | G06F 21/577 | 703/22 |
| 2015/0356294 A1* | 12/2015 | Tan | G06F 21/53 | 726/22 |
| 2016/0042180 A1* | 2/2016 | Sayre | G06F 21/563 | 726/23 |
| 2016/0170724 A1* | 6/2016 | Mahaffey | G06F 8/315 | 717/151 |
| 2017/0344351 A1* | 11/2017 | Miyoshi | G06F 8/443 | |
| 2018/0121320 A1* | 5/2018 | Dolby | G06F 11/3604 | |
| 2020/0026851 A1* | 1/2020 | Dhankha | G06F 21/53 | |
| 2020/0065076 A1* | 2/2020 | Howlett | G06F 8/75 | |
| 2020/0065497 A1* | 2/2020 | Suess | G06F 21/577 | |
| 2021/0374293 A1* | 12/2021 | Bartling | G06F 3/0679 | |
| 2023/0115149 A1* | 4/2023 | Rasmussen | G06F 16/00 | 707/798 |
| 2023/0185568 A1* | 6/2023 | Wu | G06N 3/045 | 717/123 |
| 2023/0244588 A1* | 8/2023 | Zhai | G06F 11/3409 | 717/127 |
| 2024/0045662 A1* | 2/2024 | Jain | G06F 8/43 | |

\* cited by examiner

SOFTWARE CODE VERIFICATION USING CALL GRAPHS FOR AUTONOMOUS SYSTEMS AND APPLICATIONS

BACKGROUND

Software code verification is a process intended to ensure that source code for the software matches the design specifications. For instance, the software development process includes multiple phases and/or levels of design, such as system design, architectural design, and unit design, before the coding phase. The source code, being the bottom phase and/or level of the design, may need to satisfy the design specifications for the software, where the design specifications may be viewed as a set of objectives and constraints that the source code is to meet or adhere to, respectively. In addition to the design specifications, and for software that is executed on autonomous or semi-autonomous machines (e.g., autonomous vehicles, semi-autonomous vehicles, robots, etc.), the source code may also need to satisfy additional rules arising from various certification standards, such as standards for safety and security like ISO 26262 (Road Vehicles—Functional Safety), Automotive SPICE, and/or others. Any non-compliance of a rule may be considered a violation for the software.

Traditionally, the source code is analyzed for violations either statically, such as by analyzing the source code without executing, or dynamically, such as by studying the behavior of the source code while the source code is executing. Manual code inspection is one technique to perform static analysis, but for large and complex software, manual code inspection requires a lot of effort and is prone to error. Additionally, while the software is under active development, manual code inspection may be required at every phase and/or level. For these reasons, automated systems have been developed to perform static analysis of the source code. These automated systems may differ based on programming language, the methodology used to detect the violations, and/or the types of violations that are detected.

Many, traditional automated systems perform software code verification by only analyzing the source code for the software. Because of this, these automated systems cannot identify function pointers between the functions of the software. Additionally, these automated systems focus on rules that are related to code syntax and are agnostic to design semantics. As a result, these automated systems are unable to detect violations for rules that are important for design specifications of a particular implementation, such as when the software is developed for automation.

SUMMARY

Embodiments of the present disclosure relate to techniques for performing software code verification. Systems and methods are disclosed for generating, using intermediate code and user input, a call graph that represents source code for software. For instance, the call graph may represent at least functions (e.g., internal functions, external functions, etc.) associated with the software, calls (e.g., direct calls, call pointers, etc.) between the functions, and register information associated with the functions (e.g., variables used by the functions, assembly code used by the functions, etc.). The systems and methods may further use the call graph to perform software code verification by verifying rules from design specifications for the software and/or rules from various certification standards.

In contrast to conventional systems, such as those described above, embodiments of the present disclosure may perform software code verification using a call graph that represents information about the software, such as the functions, the function calls (e.g., directed function calls, pointer function calls, etc.), and registry information. By using such a call graph for software code verification, one or more embodiments of the present disclosure analyze function pointers between functions when performing software code verification, unlike conventional automated systems. Additionally, by using such a call graph, one or more embodiments of the present disclosure focus on the conformance of the source code to design specifications, rather than just code syntax and design agnostic semantics. As a result, the systems and methods described herein verify rules that are not solvable by conventional automated systems.

BRIEF DESCRIPTION OF THE DRAWINGS

The present systems and methods for techniques for performing software code verification are described in detail below with reference to the attached drawing figures, wherein.

DETAILED DESCRIPTION

Systems and methods are disclosed related to techniques for performing software code verification. For instance, the systems and methods described herein may be used to process, using a compiler, source code for software to generate intermediate code that is represented by an intermediate language. The systems and methods described herein may then generate a call graph using the intermediate code and a file representing function pointers between functions of the software. As described herein, the call graph represents at least functions (e.g., internal functions, external functions, etc.) associated with the software, calls (e.g., direct calls, call pointers, etc.) between the functions, and register information associated with the functions (e.g., variables used by the functions, assembly code used by the functions, etc.). Using the call graph, the systems and methods described herein may perform software code verification to verify rules associated with the design specifications for the software and/or rules for various certification standards. By generating and then using a call graph for software code verification, the systems and methods described herein verify rules that the conventional systems are unable to verify.

The systems and methods described herein may be used for a variety of purposes, by way of example and without limitation, for verifying code used with respect to machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in or may be executed with respect to (e.g., to verify software associated therewith) a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 1:
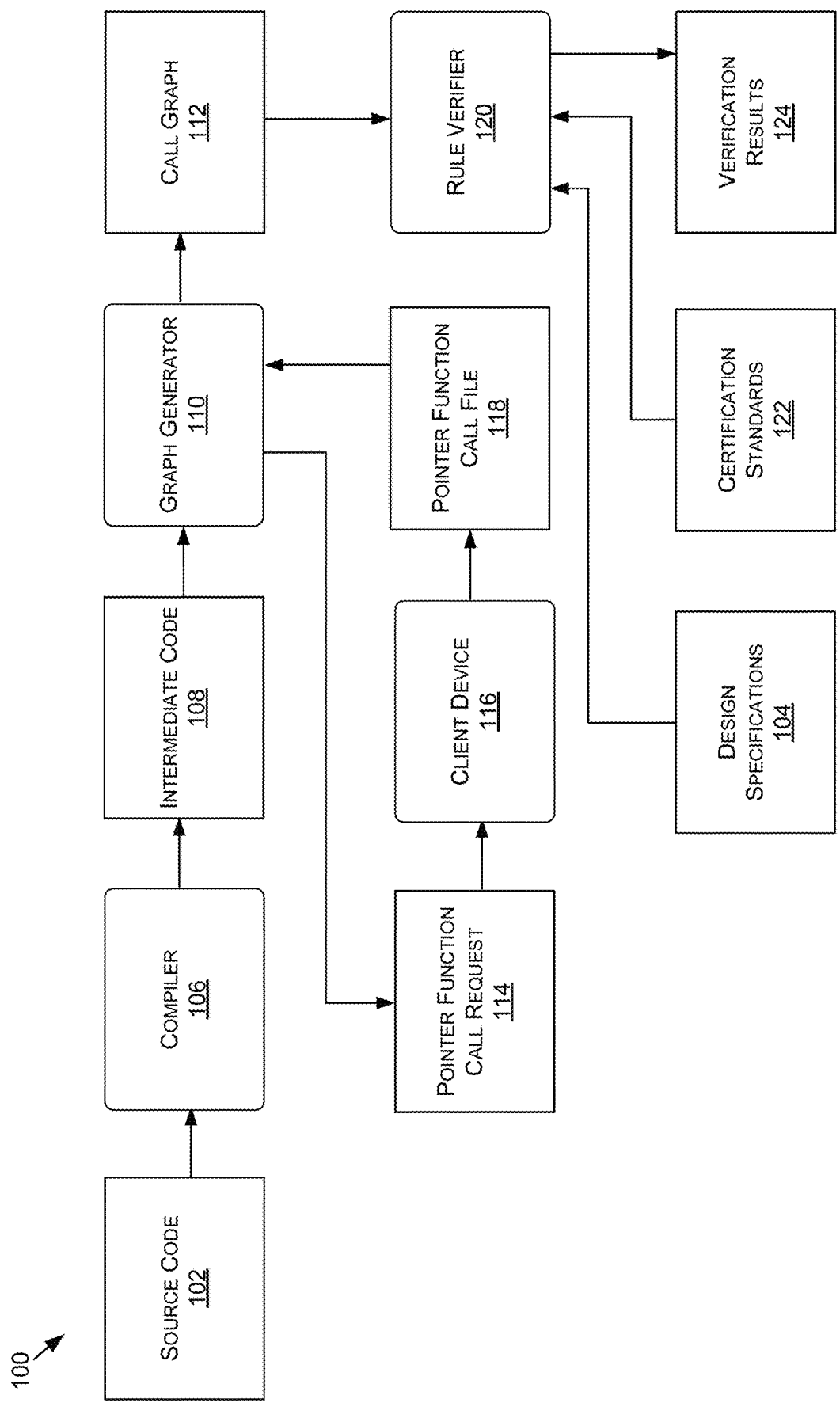
FIG. 1 illustrates an example data flow diagram for a process of generating a call graph for software code verification, in accordance with some embodiments of the present disclosure.

With reference to FIG. 1, FIG. 1 illustrates an example data flow diagram for a process 100 of generating a call graph for software code verification, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include generating and/or receiving source code 102. The source code 102 may include any collection of code that is written using a human-readable programming language (e.g., a source language, such as a high-level programming language). As described herein, the programming language for the source code 102 may include, but is not limited to, Hyper Text Markup Language (HTML), Java, C language, and/or any other type of programming language. The source code 102 may be generated for software that is based on design specifications 104, where the design specifications 104 include a detailed plan for developing the software. For instance, the design specifications 104 may indicate one or more rules for the functions of the software to follow.

The process 100 may include using a compiler 106 to process the source code 102 in order to generate intermediate code 108 represented by an intermediate language. As described herein, the compiler 106 may include any computer program that translates the source code 102 written in the source programming language to a target programming language (e.g., a lower-level language). For example, the compiler 106 may include, but is not limited to, a one-pass compiler, a multi-pass compiler, a three-stage compiler, a GNU Compiler Collection, Zephyr, and/or any other type of compiler. To translate the source code 102 from the source programming language to the target programming language, the compiler 106 may generate an intermediate representation of the source code 102, where the intermediate representation may correspond to the intermediate language of the source code 102. The intermediate language may include, but is not limited to, register transfer language (RTL), GENERIC, GIMPLE, LLVM, Java bytecode, Microsoft P-Code, and/or any other type of intermediate language.

The intermediate language may describe the data flow at the register-transfer level of the source code 102. For instance, the intermediate language may indicate functions represented by the source code 102 as well as the calls that each of the functions make to other functions. In some examples, the intermediate language may further indicate register information, such as variables (e.g., static variables, global variables, etc.) used by the functions, assembly code used by the functions, and/or other information. In some examples, the intermediate language is represented in files, where one or more (e.g., each) files may indicate the calls made by a function and/or the register information associated with the function. In some examples, the intermediate language is again represented in files, but where one or more (e.g., each) files indicate the calls made by multiple functions and/or the register information associated with the multiple functions.

The process 100 may include a graph generator 110 that processes the intermediate code 108 in order to generate a call graph 112 that represents the source code 102. For example, and since the intermediate language may be represented using files that indicate call functions, the graph generator 110 may parse through the files to determine the calls for each of the functions of the software. The graph generator 110 may then generate the call graph 112 to represent the calls for each of the functions. For example, if a file associated with a function indicates that the function includes a direct call with another function, then the graph generator 110 may generate the call graph 112 to represent the direct call between the function and the other function.

Figure 2A:
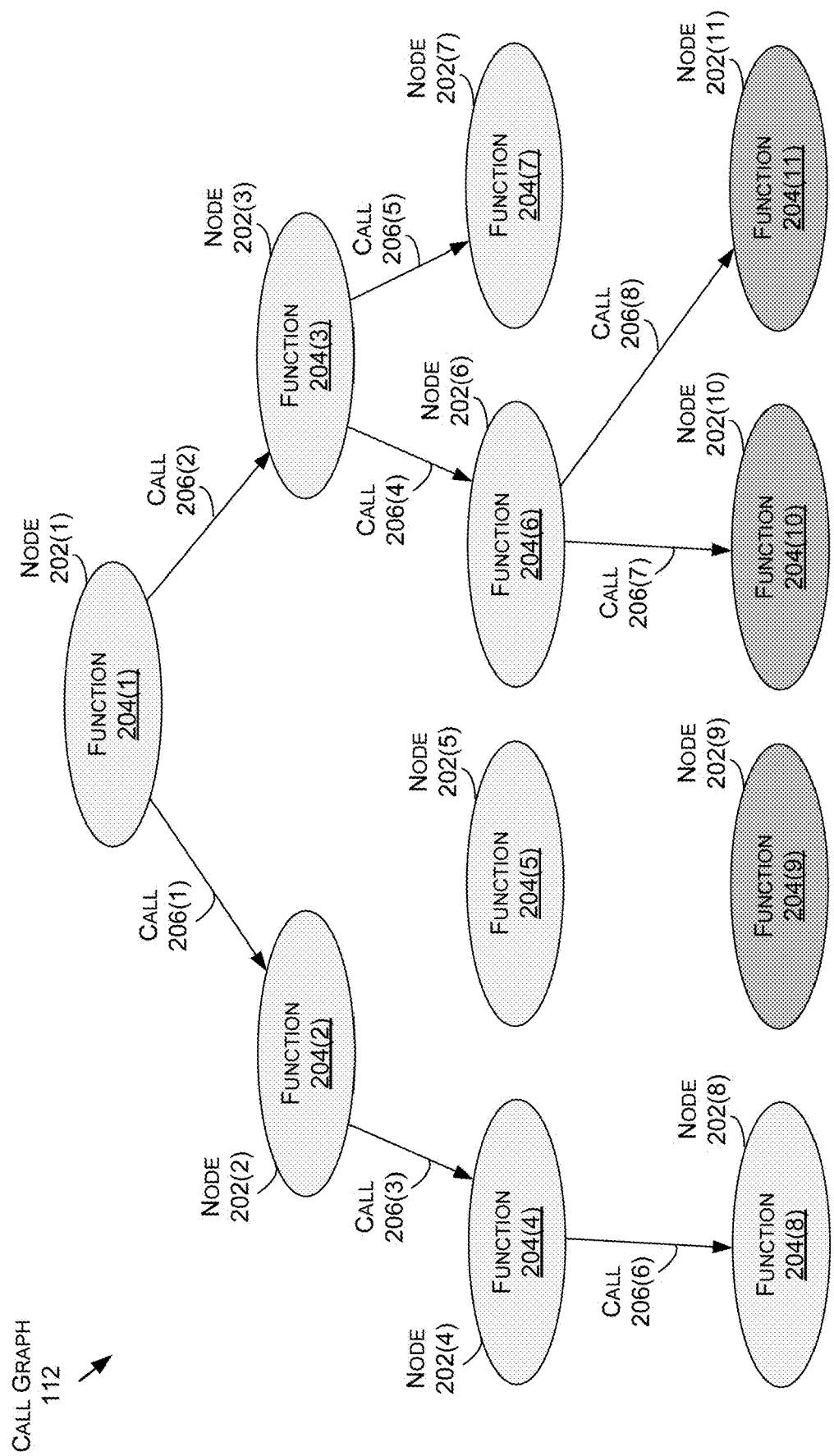
FIG. 2A illustrates an example representation of a call graph generated using intermediate code, in accordance with some embodiments of the present disclosure.

For example, FIG. 2A illustrates an example representation of the call graph 112 generated using the intermediate code 108, in accordance with some embodiments of the present disclosure. In some examples, and as illustrated in FIG. 2A, the call graph 112 may include nodes 202(1)-(11) (also referred to singularly as "node 202" or in plural as "nodes 202"), where the nodes 202 of the call graph 112 represent functions 204(1)-(11) (also referred to singularly as "function 204" or in plural as "functions 204"). Calls 206(1)-(8) (also referred to singularly as "call 206" or in plural as "calls 206") between the functions 204 may be represented as connections (e.g., arrows) between the nodes 202 within the call graph 112. For example, and as shown by the example of FIG. 2A, the first function 204(1) represented by the first node 202(1) includes both the first call 206(1) with the second function 204(2) represented by the second node 202(2) and the second call 206(2) with the third function 204(3) represented by the third node 202(3). Additionally, the third function 204(3) represented by the third node 202(3) includes both the fourth call 206(4) with the sixth function 204(6) represented by the sixth node 202(6) and the fifth call 206(5) with the seventh function 204(7) represented by the seventh node 202(7).

As further shown, the call graph 112 uses first characteristic(s) for nodes 202(1)-(8) and second, different characteristic(s) for nodes 202(9)-(11). In some examples, the first characteristic(s) may be used to indicate functions 204(1)-(8) that are internal to the software while the second characteristic(s) may be used to indicate functions 204(9)-(11) that are external to the software. While the example of FIG. 2A illustrates the first characteristic(s) as including a first shading and the second characteristic(s) as including a second shading, in other examples, the first characteristic(s) and/or the second characteristic(s) may include any other type of characteristic. For example, the first characteristic(s) and/or the second characteristic(s) may include line patterns, fill patterns, shapes, colors, and/or any other type of characteristic.

In some instances, functions may also be called using function pointers that are resolved during actual execution of the source code 102. Because of this, and in some examples, the graph generator 110 may not generate the entire call graph 112 using the intermediate code 108 since functions 204 associated with the variables for the function pointers are unknown to the graph generator 110 using the intermediate language. However, the functions 204 associated with the variables at particular invocations may be known by one or more users generating the source code 102. As such, the graph generator 110 may provide for a mechanism that allows the user(s) to input the functions 204 for the function pointers.

Figure 3:
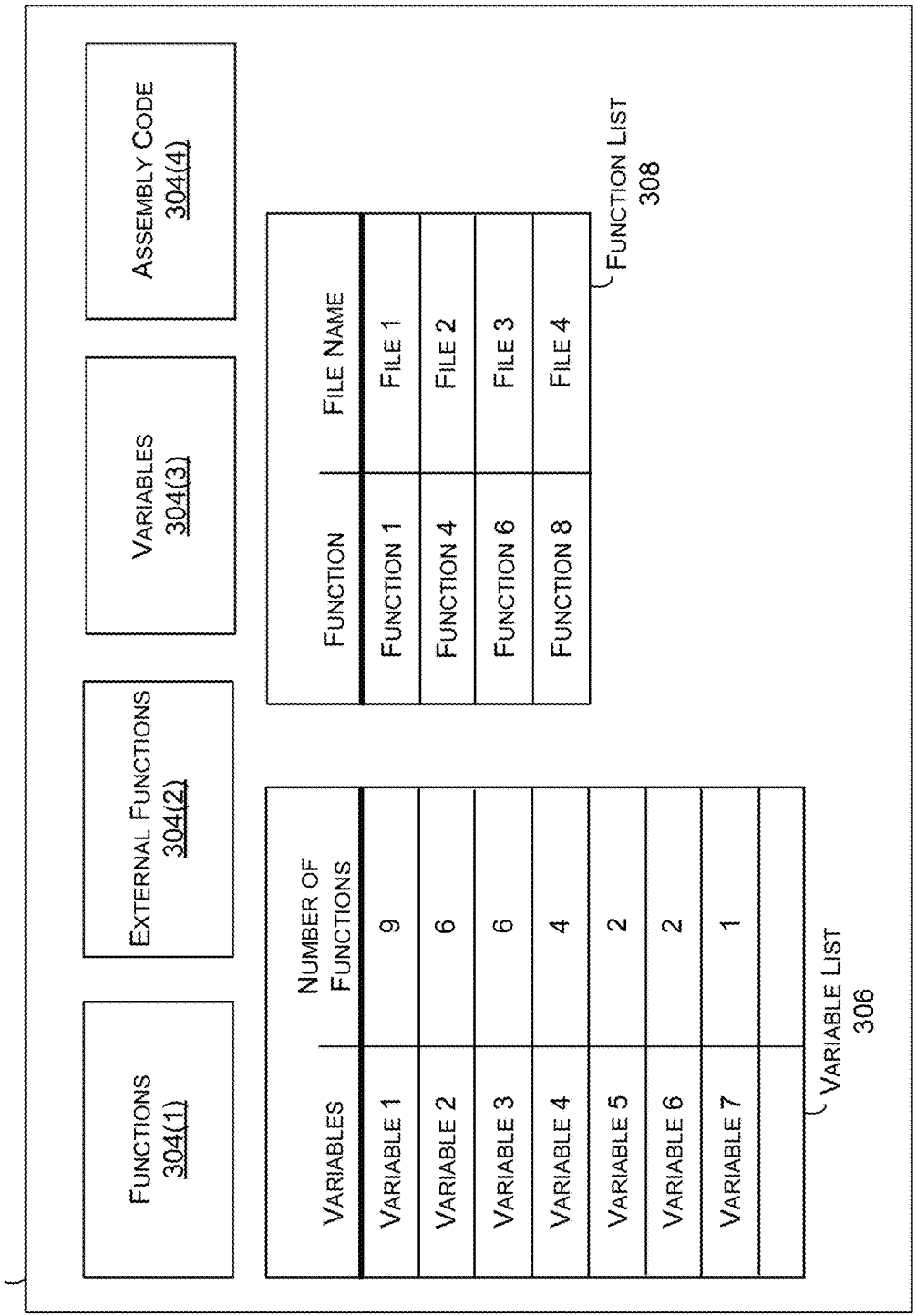
FIG. 3 illustrates an example user interface for providing information about source code, in accordance with some embodiments of the present disclosure.

For example, the process 100 may include the graph generator 110 analyzing the call graph 112 (and/or a user interface associated with the call graph 112, which is illustrated and discussed with respect to FIG. 3) and, based on the analysis, identifying the functions 204 that include function pointers. In some examples, the graph generator 110 identifies a function pointer based on a function 204 calling a variable, where a name of another function 204 for which the function 204 is calling is stored in and/or represented by the variable. The graph generator 110 may then generate a pointer function call request 114 that includes the identified functions 204, the variable values, the variable addresses, and/or any other information. The graph generator 110 may then provide the pointer function call request 114 to user(s) of the source code 102, such as by using a client device 116.

For instance, and in the example of FIG. 2A, the graph generator 110 may determine that the second function 204(2) calls a first variable and that the fourth function 204(4) calls a second variable. As such, the graph generator 110 may generate the pointer function call request 114 to indicate the second function 204(2), the value of the first variable, the address of the first variable, the fourth function 204(4), the value of the second variable, and/or the address of the second variable. The graph generator 110 may then provide the pointer function call request 114 to the client device 116.

In some examples, the client device 116 may display a user interface that includes the pointer function call request 114. The user(s) is then able to use the client device 116 to provide the functions 204 that are associated with the various variables. In some examples, the user(s) provides the functions 204 by inputting the functions 204 for the variables, where the client device 116 then generates a pointer function call file 118 representing the mapping between the variables and the functions 204. In some examples, the client device 116 already stores the pointer function call file 118 that represents the mapping between the variables and the functions. In any of these examples, the process 100 may include the client device 116 providing the pointer function call file to the graph generator 110.

Figure 2B:
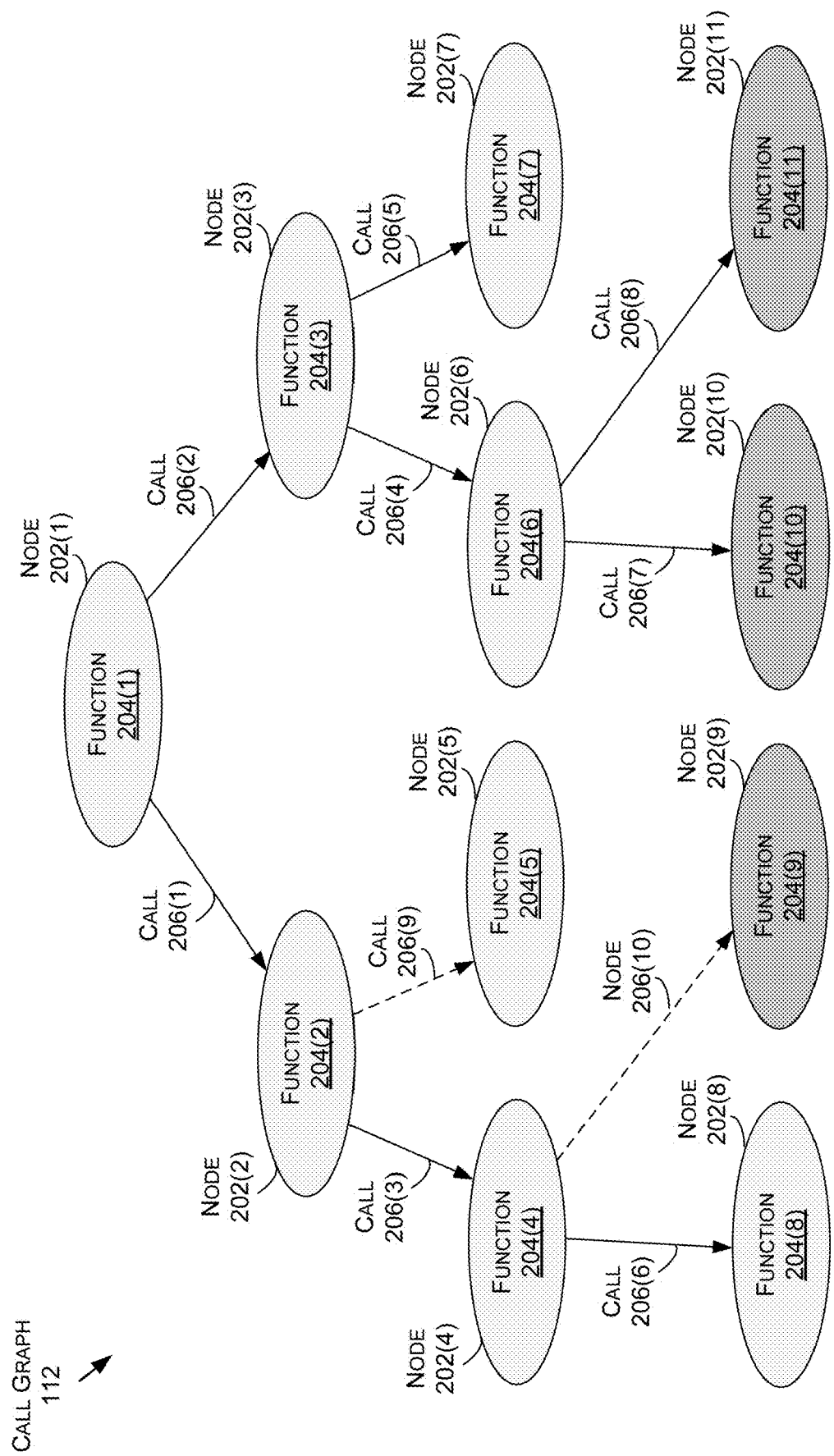
FIG. 2B illustrates an example representation of updating the call graph of FIG. 2A to include function pointers, in accordance with some embodiments of the present disclosure.

The process 100 may include the graph generator 110 updating the call graph 112 to include the function pointers indicated by the pointer function call file 118. For example, FIG. 2B illustrates an example representation of updating the call graph 112 to include function pointers, in accordance with some embodiments of the present disclosure. In the example of FIG. 2B, the pointer function call file 118 may indicate (i) a first mapping between the first variable that the second function 204(2) calls and the fifth function 204(5) and (ii) a second mapping between the second variable that the fourth function 204(4) calls and the ninth function 204(9). As such, the graph generator 110 may analyze the pointer function call file 118 and, based on the analysis, identify the first mapping and the second mapping. The graph generator 110 may then update the call graph 112 to indicate a ninth call 206(9) (e.g., a pointer function call) between the second function 204(2) and the fifth function 204(5) and a tenth call 206(10) (e.g., a pointer function call) between the fourth function 204(4) and the ninth function 204(9).

In some examples, and as illustrated by the example of FIG. 2B, the graph generator 110 may use first characteristic(s) for connections that represent the direct function calls 206(1)-(8) and second characteristic(s) for connections that represent pointer function calls 206(9)-(10). While the example of FIG. 2B illustrates the first characteristic(s) as including solid lines and the second characteristic(s) as including dashed lines, in other examples, the first characteristic(s) and/or the second characteristic(s) may include any other type of characteristic. For example, the first characteristic(s) and/or the second characteristic(s) may include line colors, line styles, connector shapes, and/or any other type of characteristic.

In some examples, the call graph 112 and/or a user interface may include additional information about the source code 102. For example, since the intermediate language may indicate the functions 204 that use global variables and/or static variables, the graph generator 110 may generate the call graph 112 and/or the user interface to further indicate which of the functions 204 use the global variables and/or the static variables. For another example, since the intermediate language may indicate the functions 204 that use assembly code, the graph generator 110 may generate the call graph 112 and/or the user interface to further indicate which of the functions 204 use the assembly code.

For example, FIG. 3 illustrates an example user interface 302 for providing information about the source code 102, in accordance with some embodiments of the present disclosure. As shown, the user interface 302 includes interface elements 304(1)-(4) (also referred to singularly as "interface element 304" or in plural as "interface elements 304"). As described herein, an interface element 304 may include, but is not limited to, a button, an icon, an image, a widget, a video, a slider, a list, and/or any other element associated with the user interface 302. In the example of FIG. 3, the first interface element 304(1) may provide information about the functions 204 of the call graph 112, such as the number of functions 204. The second interface element 304(2) may provide information about just the external functions 204(9)-(11), such as the number of external functions 204(9)-(11). Additionally, the third interface element 304(3) may provide information about the variables (e.g., the static variables, the global variables, etc.), such as the number of variables. Furthermore, the fourth interface element 304(4) may provide information about the assembly code.

In some examples, the interface elements 304 are selectable to provide additional information associated with the source code 102. For example, the user may have selected the third interface element 304(3) in order to view additional information about the variables. As such, the user interface 302 may provide a variable list 306 that indicates the variables used by the functions 204 as well as the number of functions 204 that use each variable. For instance, and as illustrated in FIG. 3, a first variable (Variable 1) is used by nine of the functions 204, a second variable (Variable 2) is used by six of the functions 204, a third variable (Variable 3) is used by six of the functions 204, a fourth variable (Variable 4) is used by four of the functions 204, and so forth.

In some examples, the user interface 302 may allow the user to select one of the variables from the variable list 306. Based on the selection, the user interface 302 may then provide additional information associated with the selected variable. For instance, and in the example of FIG. 3, the user may have selected the fourth variable (Variable 4) from the variable list 306. In response, the user interface 302 may provide a function list 308 that indicates each of the functions 204 that use the selected variable. For example, the function list 308 indicates that the first function 204(1), the fourth function 204(4), the sixth function 204(6), and the eighth function 204(8) use the fourth variable (Variable 4). Additionally, the function list 308 indicates the names of the files associated with each of the functions 204. This way, the user may quickly determine which of the functions 204 are using the various variables.

After generating the call graph 112 and/or the user interface 302, the process 100 may include using a rule verifier 120 to verify one or more rules associated with the design specifications 104 for the software and/or one or more rules associated with certification standards 122. For example, the design specifications 104 and/or the certification standards 122 may indicate that specific functions of the software, such as functions that are more critical for different criteria like performance, safety, redundancy, and/or reliability, are prevented from making external function calls. As such, a first rule (e.g., an external call rule) may indicate that such functions 204 are not allowed to make the external function calls.

To verify the external critical call rule using the call graph 112, the rule verifier 120 initially determines one or more (e.g., each) of the functions 204 that are allowed to make external function calls. In some examples, the rule verifier 120 determines the one or more (e.g., each) of the functions 204 by receiving a file (e.g., an "external call file") that includes an external call list of the functions 204, such as from the client device 116. The rule verifier 120 then analyzes the call graph 112 using the external call list in order to determine whether any function(s) 204 that is not included in the external call list makes external function calls. If the rule verifier 120 determines that only the functions 204 that are included in the external call list make the external function calls, then the rule verifier 120 may determine that the external call rule is verified. However, if the rule verifier 120 determines that a function 204 that is not included in the external call list makes an external function call, then the rule verifier 120 may determine that the external call rule is unverified.

Figure 4A:
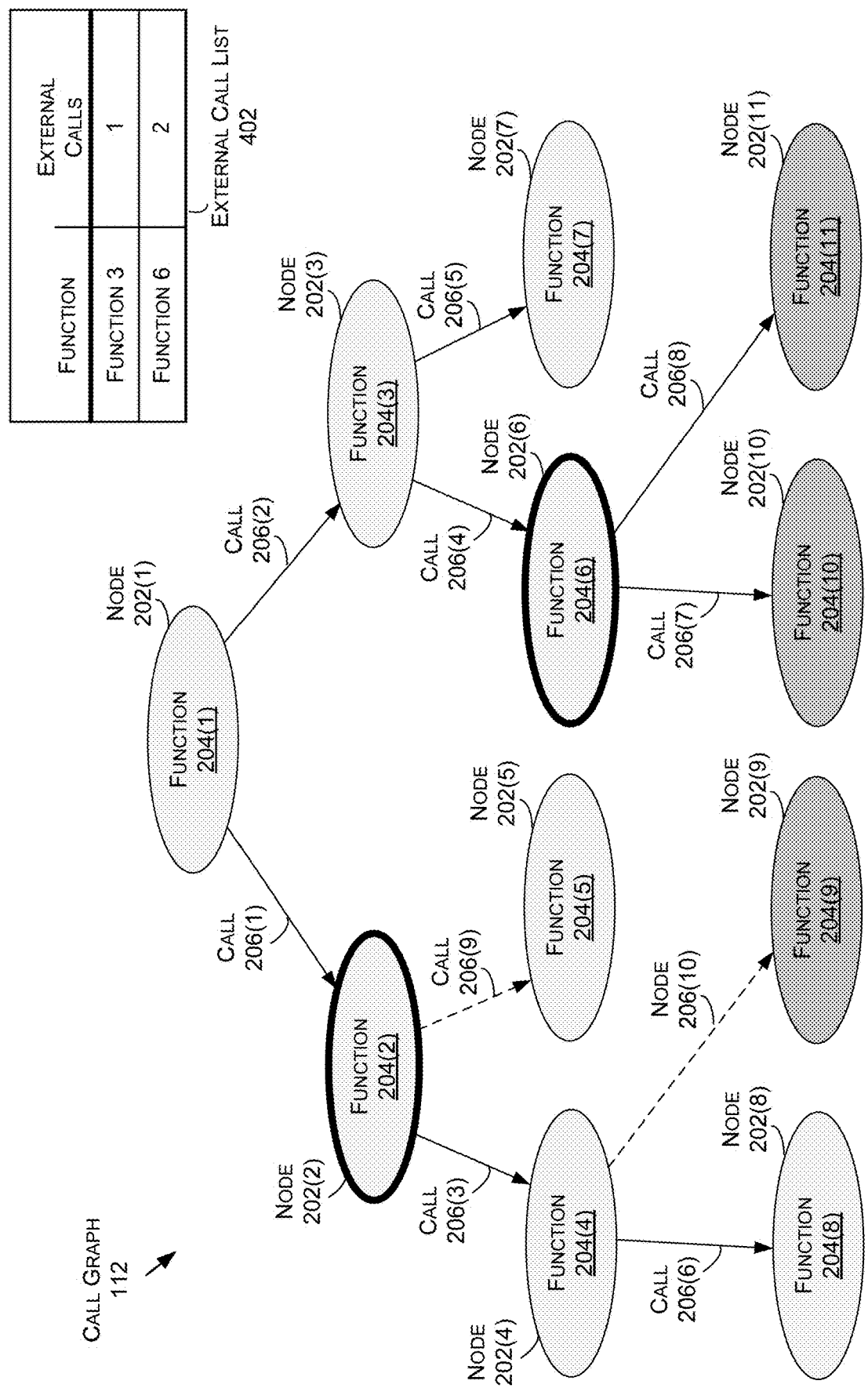
FIG. 4A illustrates an example of verifying a critical external call rule, in accordance with some embodiments of the present disclosure.

For example, FIG. 4A illustrates an example of verifying the external critical call rule, in accordance with some embodiments of the present disclosure. For instance, and in the example of FIG. 4A, an external call list 402 indicates that the second function 204(2) is authorized to make one external call and the sixth function 204(6) is authorized to make two external calls. As such, FIG. 4A illustrates the two nodes 202(2), 202(6) associated with these two functions 204(2), 204(6) with bold outlining to indicate that the functions 204(2), 204(6) that are authorized to make the external calls. While analyzing the call graph 112, the rule verifier 120 may determine that the sixth function 204(6) does make external calls 206(7)-(8). In some examples, the rule verifier 120 may further determine that the number of external calls made by the sixth function 204(6) is less than or equal to the number of authorized external calls. For instance, and in the example of FIG. 4A, the rule verifier 120 may verify that the two external calls 206(7)-(8) made by the sixth function 204(6) is less than or equal to the number of authorized external calls, which is also two.

Additionally, while analyzing the call graph 112, the rule verifier 120 may determine that the second function 204(2) does not make any external calls. In some examples, the rule verifier 120 may still determine that the external call rule is verified since functions 204 that are authorized to make external calls are not required to make any external calls for the external call rule to be verified. In other examples, the rule verifier 120 may determine that the external call rule is unverified since functions 204 that are authorized to make external calls are required to make at least one external call and/or the required number of external calls for the external call rule to be verified.

Furthermore, the rule verifier 120 may analyze the call graph 112 and determine, based on the analysis, that the fourth function 204(4) is also making the external call 206(10) to the ninth function 204(9). Based on this determination, the rule verifier 120 may determine that the external call rule for the source code 102 is unverified since the fourth function 204(4) is unauthorized to make external calls.

In some examples, the external call list may indicate external functions that a function 204 is able to make. In such examples, the rule verifier 120 may analyze the call graph 112 to determine the external calls being made by the function 204. If the function 204 is making external function calls within the list, then the rule verifier 120 may determine that the rule is verified. However, if the function 204 is making an external function call that is not included in the list, then the rule verifier 120 may determine that the rule is unverified.

The design specifications 104 and/or the certificate standards 122 may indicate that specific functions 204 (e.g., caller functions) are only to be called after calling one or more other functions 204 (e.g., prerequisite function(s)). As such, a second rule (e.g., a prerequisite call rule) may indicate that caller functions 204 are only to be called after prerequisite functions 204. To verify this prerequisite call rule for a caller function 204, the rule verifier 120 may analyze the call graph 112 to determine whether the caller function 204 includes common ancestor(s) with each prerequisite function 204. In some examples, the rule verifier 120 may determine that the caller function 204 includes a common ancestor with a prerequisite function 204 based on both the node 202 representing the caller function 204 and the node 202 representing the prerequisite function 204 including a relationship with another node 202 representing another function 204. If the rule verifier 120 determines that the caller function 204 includes a common ancestor(s) with one or more (e.g., each) prerequisite function 204, then the rule verifier 120 may determine that the prerequisite call rule is verified for the caller function 204. However, if the rule verifier 120 determines that the caller function 204 does not include common ancestor(s) with one or more (e.g., each) prerequisite function 204, then the rule verifier 120 may determine that the prerequisite call rule is unverified for the caller function 204.

Figure 4B:
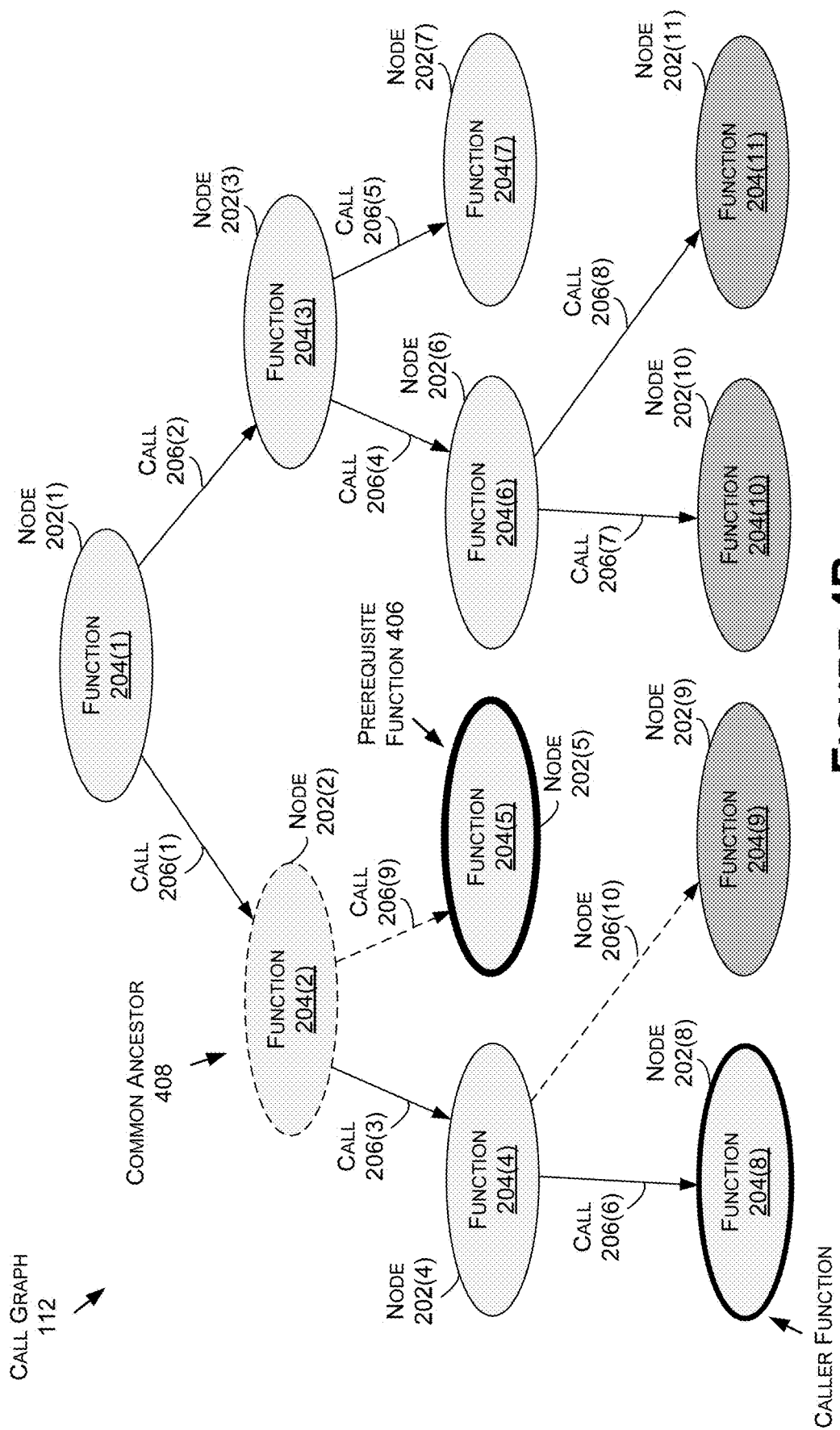
FIG. 4B illustrates an example of verifying a prerequisite call rule, in accordance with some embodiments of the present disclosure.

For example, FIG. 4B illustrates an example of verifying a prerequisite call rule, in accordance with some embodiments of the present disclosure. In the example of FIG. 4B, a caller function 404 includes the eighth function 204(8) and is represented with bold outlining. Additionally, a prerequisite function 406 includes the fifth function 204(5) and is also represented by bold outlining. As such, the rule verifier 120 may analyze the call graph 112 in order to determine whether the eighth function 204(8) includes a common ancestor with the fifth function 204(5). In the example of FIG. 4B, the rule verifier 120 may determine that a common ancestor 408 for the eighth function 204(8) and the fifth function 204(5) includes the second function 204(2), which is represented by a dashed outline. In some examples, the rule verifier 120 makes the determination based on (i) the second function 204(2) having the ninth call 206(9) with the fifth function 205(5) and (ii) the second function 204(2) having the third call 206(3) with the fourth function 204(4), which then has the sixth call 206(6) with the eighth function 204(8). As such, the rule verifier 120 may verify the prerequisite call rule for at least the eighth function 204(8).

In some examples, the overall software design may consist of a number of hierarchical levels of design descriptions for implementation. For instance, the design descriptions may indicate the sequence of calls for functions of the software. As such, a third rule (e.g., a sequence call rule) for the design specifications 104 may indicate that the source code 102 needs to follow the design descriptions for the software. To verify this sequence call rule, the rule verifier 120 may receive the design specifications 104 in parsable notation, such as AUML, DOT, and/or any other parsable notation. The rule verifier may also receive a format configuration file that contains the source files for the unit association, where the rule verifier 120 is able identify the owning unit using this format configuration file. Additionally, the rule verifier 120 may receive a format configuration file containing the function name to the owning element association, where the rule verifier 120 is able to identify the owning element using this format configuration file. Using this information, the rule verifier 120 is then able to verify the different hierarchies of the design specifications.

For instance, and in some examples, the rule verifier 120 may use this information to trim the call graph 112 per level. By trimming the call graph 112 per level, the rule verifier 120 is able to verify that the specific functions are called at each level of the hierarchy. The rule verifier 120 may then verify the sequence call rule based on determining that the source code 102 follows the design descriptions for the software. To verify the sequence call rule for a sequence of the functions 204, the rule verifier 120 may determine whether the functions 204 are called in an order that matches the sequence as specified by the design descriptions. If the rule verifier 120 determines that the functions 204 are called in the sequence that is specified by the design descriptions, then the rule verifier 120 may determine that the sequence call rule for those design descriptions is verified. However, if the rule verifier 120 determines that the functions 204 are not called in the sequence that is specified by the design descriptions, then the rule verifier 120 may determine that the sequence call rule for those design descriptions is unverified.

Figure 4C:
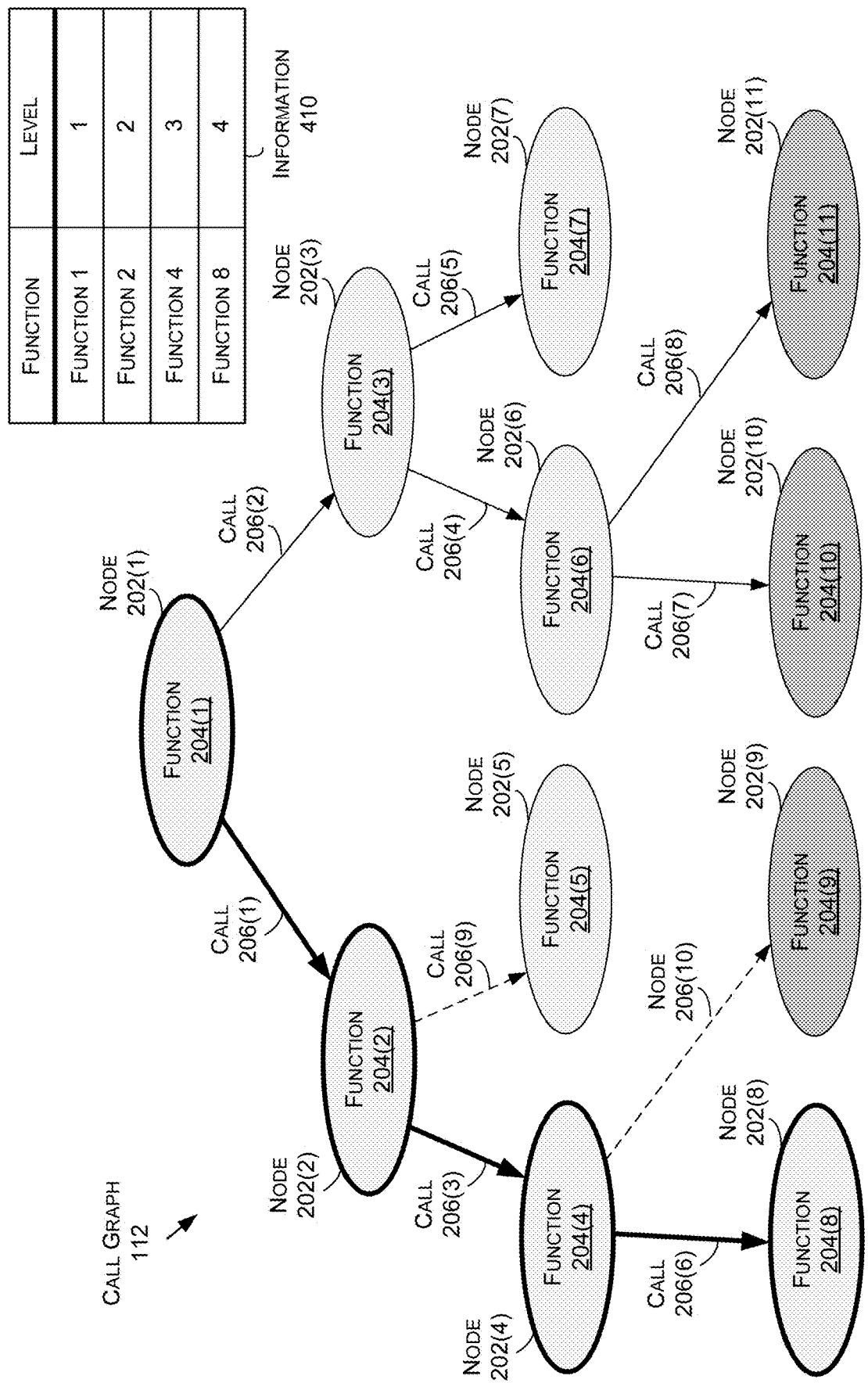
FIG. 4C illustrates an example of verifying a sequence call rule, in accordance with some embodiments of the present disclosure.

For example, FIG. 4C illustrates an example of verifying a sequence call rule, in accordance with some embodiments of the present disclosure. In the example of FIG. 4C, information 410 may indicate a call sequence that includes the first function 204(1) being at the highest level, followed by the second function 204(2) being at the second highest level, followed by the fourth function 204(4) being at the third highest level, and finally followed by the eighth function 204(8) being at the fourth highest level. As such, the rule verifier 120 may verify the sequence call rule based on the order in which the functions 204 are called matching the sequence indicated by the information 410. For instance, and in the example of FIG. 4C, the rule verifier 120 may determine that the order includes the first function 204(1) making the first call 206(1) to the second function 204(2), followed by the second function 204(2) making the third call 206(3) to the fourth function 204(4), followed by the fourth function 204(4) making the sixth call 206(6) to the eighth function 204(8), where the order is represented using bold lines. As such, the rule verifier 120 may verify the sequence call rule for at least this sequence of the functions 204.

In some examples, only specific functions may be authorized to use global variables and/or static variables. As such, a fourth rule (e.g., a variable rule) for the design specifications 104 and/or the certification standards 122 may indicate which of the functions 204 are authorized to use global variables and/or static variables and/or which of the functions 204 are unauthorized to use global variables and/or static variables. To verify this variable rule using the call graph 112, the rule verifier 120 determines one or more (e.g., each) of the functions 204 that are authorized to use global variables and/or static variables and/or determines one or more (e.g., each) of the functions 204 that are unauthorized to use global variables and/or static variables. In some examples, the rule verifier 120 determines these functions by receiving a file (e.g., a "variable authorized file") that includes a list (e.g., a "variable authorized list") of the authorized functions 204, such as from the client device 116. The rule verifier 120 then analyzes the call graph 112 using the variable authorized file to determine whether any function(s) 204, that are not included in the variable authorized list, use global variables and/or static variables. If the rule verifier 120 determines that only the functions 204 that are included in the variable authorized list use global variables and/or static variables, then the rule verifier 120 may determine that the variable rule is verified. However, if the rule verifier 120 determines that at least one function 204 that is not included in the variable authorized list uses global variables and/or static variables, then the rule verifier 120 may determine that the variable rule is unverified.

Figure 4D:
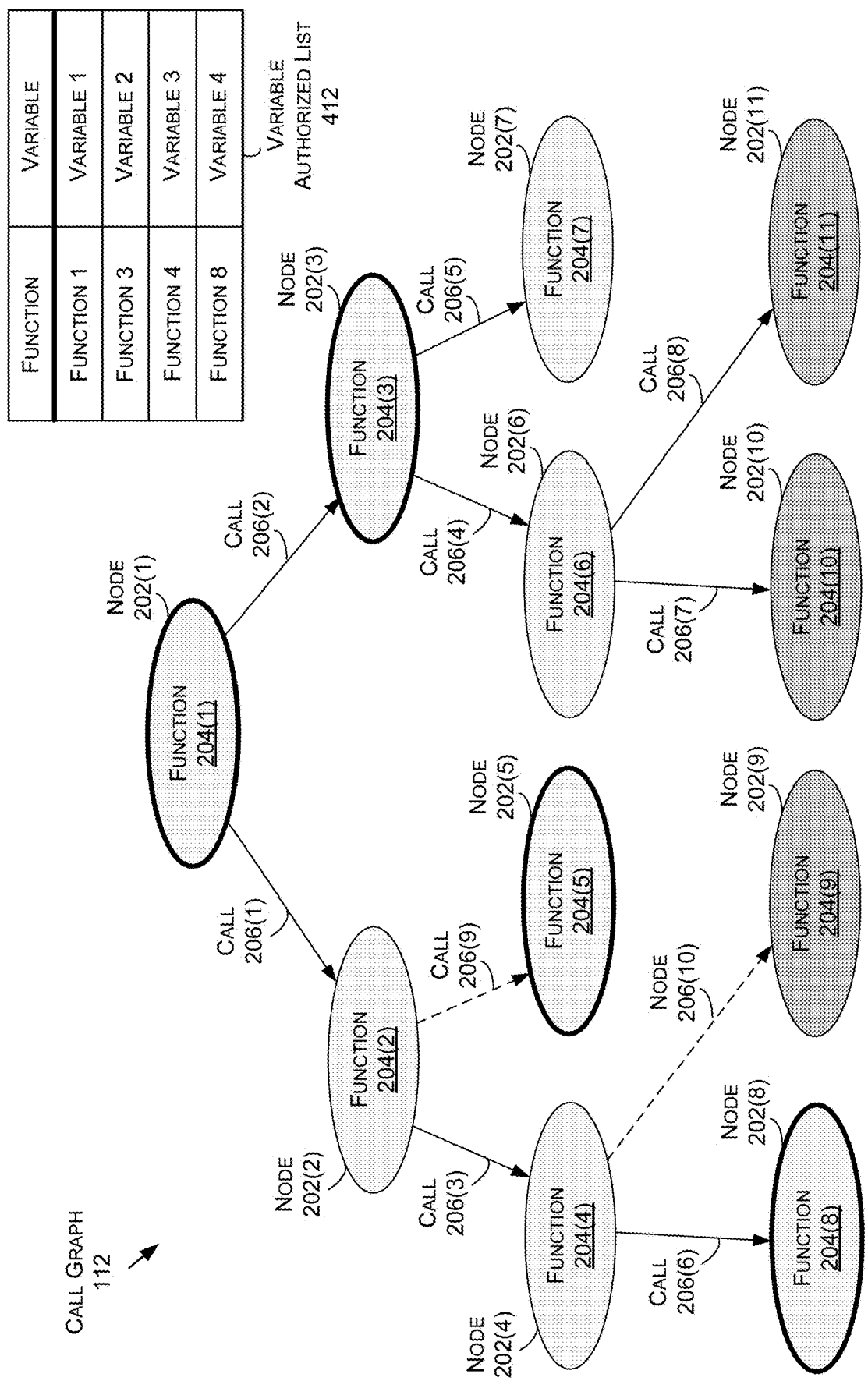
FIG. 4D illustrates an example of verifying a variable rule, in accordance with some embodiments of the present disclosure.

For example, FIG. 4D illustrates an example of verifying a variable rule, in accordance with some embodiments of the present disclosure. In the example of FIG. 4D, each of the functions 204(1), 204(3), 204(5), and 204(8) that use global variables (and/or static variables in other examples) may be indicated using bold outlines. However, in other examples, each of the functions 204(1), 204(3), 204(5), and 204(8) may be indicated using one or more additional and/or alternative techniques, such as shading, letters, numbers, line types, and/or any other characteristics. A variable authorized list 412 indicates that the first function 204(1), the third function 204(3), the fourth function 204(4), and the eighth function 204(8) are authorized to use the global variables. As such, the rule verifier 120 may analyze the call graph 112 to determine that the first function 204(1), the third function 204(3), and the eighth function 204(8) do use global variables.

The rule verifier 120 may also determine that the fourth function 204(4) does not use global variables even though the fourth function 204(4) is authorized to use the global variables. In some examples, based on this determination, the rule verifier 120 may determine that the variable rule is unverified since each function 204 that is authorized to use global variables is required to use the global variables. In other examples, based on this determination, the rule verifier 120 may determine that the variable rule may still be verified since functions 204 that are authorized to use global variables may not be required to actually use the global variables.

Additionally, the rule verifier 120 may determine, based on the analysis, that the fifth function 204(5) is also using global variables. Since the fifth function 204(5) is unauthorized to use global variables, as indicated by the variable authorized list 412, the rule verifier 120 may determine that the variable rule for the source code 102 is unverified.

While the examples above describe the rule verifier 120 as using the call graph 112 to verify the variable rule, in other examples, the rule verifier 120 may use additional and/or alternative techniques. For example, the rule verifier 120 may use the user interface 302 to verify the variable rule. To use the user interface 302, the rule verifier 120 may analyze the user interface 302 in order to determine each of the functions 204 that use global variables. The rule verifier 120 may then compare the functions 204 that use the global variables to the variable authorized list 412 to determine whether any function 204 that uses global variables is not included in the variable authorized list 412. Again, if the rule verifier 120 determines that only the functions 204 that are included in the variable authorized list 412 use global variables, then the rule verifier 120 may determine that the variable rule is verified. However, if the rule verifier 120 determines that at least one function 204 that is not included in the variable authorized list 412 uses global variables, then the rule verifier 120 may determine that the variable rule is unverified.

Additionally, in some examples, the rule verifier 120 may further determine whether the functions 204 that are authorized to use global variables (and/or static variables) are in fact using the correct authorized variables. For instance, and as shown by the example of FIG. 4D, the variable authorized list 412 indicates that the first function 204(1) is authorized to use the first variable (Variable 1), the third function 204(3) is authorized to use the second variable (Variable 2), the fourth function 204(4) is authorized to use the third variable (Variable 3), and the eighth function 204(8) is authorized to use the fourth variable (Variable 4). As such, the rule verifier 120 may further analyze the call graph 112 (which may further indicate the global variables being used by each function 204) and/or the user interface 302 to determine which global variables are being used by each function 204. If the rule verifier 120 determines that each of the functions 204 are using the authorized global variables, then the rule verifier 120 may determine that the variable rule is verified. However, if the rule verifier 120 determines that at least one function 204 is using an unauthorized global variable, then the rule verifier 120 may determine that the variable rule is unverified.

Furthermore, while the examples above describes the rule verifier 120 using the variable authorized list 412 that indicates the functions 204 that are authorized to use the global variables (and/or static variables), in other examples, the rule verifier 120 may perform similar processes using a file (e.g., a "variable unauthorized file") that includes a list (e.g., a "variable unauthorized list") of the functions 204 that are unauthorized to use the global variables (and/or static variables). For instance, the rule verifier 120 may analyze the call graph 112 and/or the user interface 302 using the variable unauthorized file to determine whether any of the function(s) 204, that are included in the variable unauthorized list, use global variables (and/or static variables). If the rule verifier 120 determines that none of the functions 204 that are included in the variable unauthorized list use global variables (and/or static variables), then the rule verifier 120 may determine that the variable rule is verified. However, if the rule verifier 120 determines that at least one function 204 that is included in the variable unauthorized list uses global variables (and/or static variables), then the rule verifier 120 may determine that the variable rule is unverified.

In some examples, only specific functions 204 may be authorized to use assembly code. As such, a fifth rule (e.g., an assembly rule) for the design specifications 104 and/or the certification standards 122 may indicate which of the functions 204 are authorized to use assembly code and/or which of the functions 204 are unauthorized to use assembly code. To verify this assembly rule using the call graph 112, the rule verifier 120 determines each of the functions 204 that are authorized to use assembly code and/or determines each of the functions 204 that are unauthorized to use assembly code. In some examples, the rule verifier 120 determines these functions by receiving a file (e.g., an "assembly authorized file") that includes a list (e.g., an "assembly authorized list") of the authorized functions 204, such as from the client device 116. The rule verifier 120 then analyzes the call graph 112 using the assembly authorized file to determine whether any function(s) 204, that are not included in the assembly authorized list, use assembly code. If the rule verifier 120 determines that only the functions 204 that are included in the assembly authorized list use assembly code, then the rule verifier 120 may determine that the assembly rule is verified. However, if the rule verifier 120 determines that at least one function 204 that is not included in the assembly authorized list uses assembly code, then the rule verifier 120 may determine that the assembly rule is unverified.

Figure 4E:
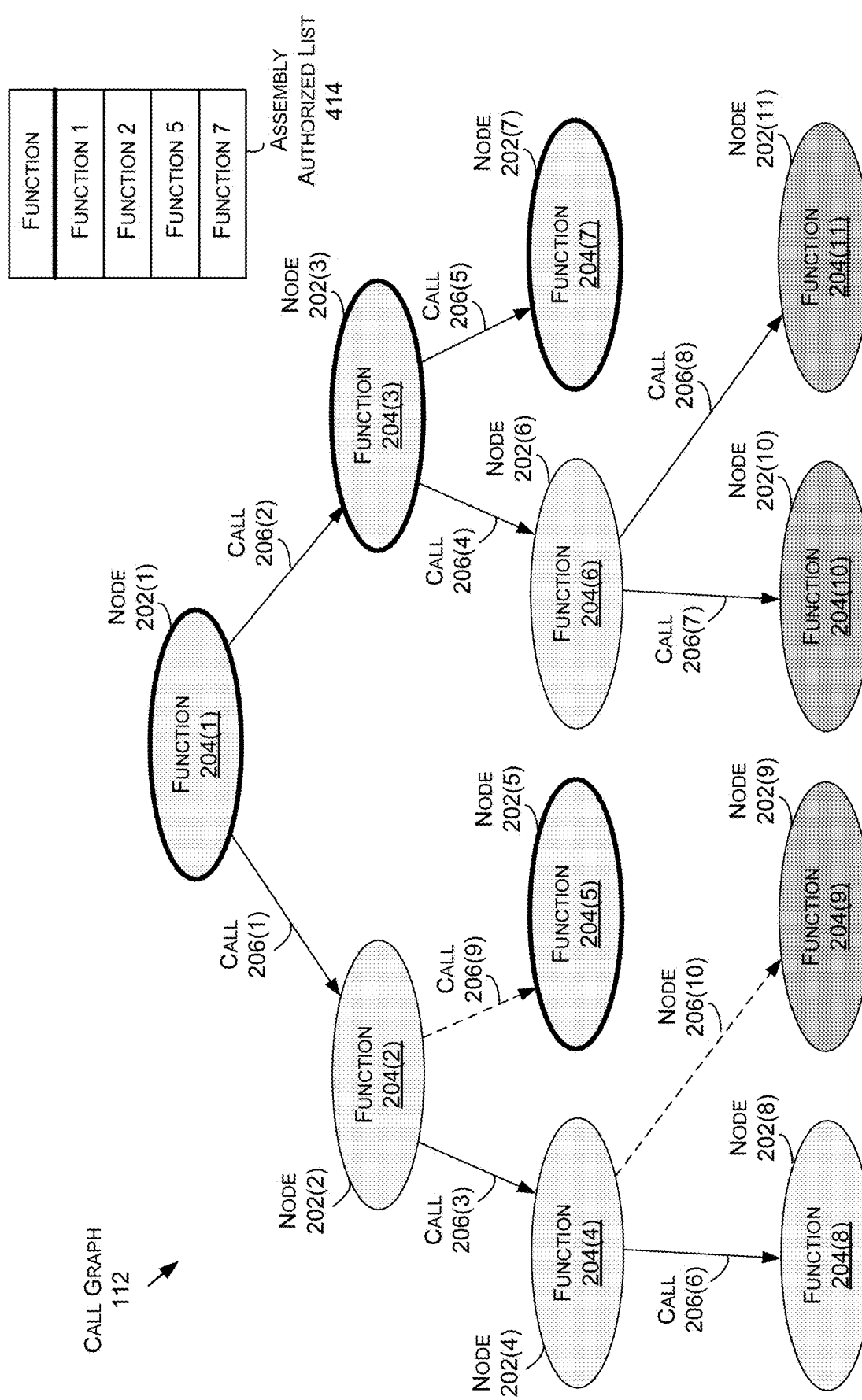
FIG. 4E illustrates an example of verifying an assembly rule, in accordance with some embodiments of the present disclosure.

For example, FIG. 4E illustrates an example of verifying an assembly rule, in accordance with some embodiments of the present disclosure. In the example of FIG. 4E, each of the functions 204(1), 204(3), 204(5), and 204(7) that use assembly code may be indicated using bold outlines. However, in other examples, each of the functions 204(1), 204(3), 204(5), and 204(7) may be indicated using one or more additional and/or alternative techniques, such as shading, letters, numbers, line types, and/or any other characteristics. An assembly authorized list 412 indicates that the first function 204(1), the second function 204(2), the fifth function 204(5), and the seventh function 204(7) are authorized to use the assembly code. As such, the rule verifier 120 may analyze the call graph 112 to determine that the first function 204(1), the fifth function 204(5), and the seventh function 204(7) do use assembly code.

In embodiments, the rule verifier 120 may determine that the second function 204(2) does not use assembly code even though the second function 204(2) is authorized to use the assembly code. In some examples, based on this determination, the rule verifier 120 may determine that the assembly rule is unverified since each function 204 that is authorized to use assembly code is required to use the assembly code. In other examples, based on this determination, the rule verifier 120 may determine that the assembly rule may still be verified since functions 204 that are authorized to use assembly code may not be required to actually use the assembly code.

Additionally, the rule verifier 120 may determine, based on the analysis, that the third function 204(3) is also using assembly code. Since the third function 204(3) is unauthorized to use assembly code, as indicated by an assembly authorized list 414, the rule verifier 120 may determine that the assembly rule for the source code 102 is unverified.

While the examples above describe the rule verifier 120 as using the call graph 112 to verify the assembly rule, in other examples, the rule verifier 120 may use additional and/or alternative techniques. For example, the rule verifier 120 may use the user interface 302 to verify the assembly rule. To use the user interface 302, the rule verifier 120 may analyze information included in the user interface 302 in order to determine each of the functions 204 that use assembly code. The rule verifier 120 may then compare the functions 204 that use the assembly code to the assembly authorized list 414 to determine whether any function 204 that uses assembly code is not included in the assembly authorized list 414. Again, if the rule verifier 120 determines that only the functions 204 that are included in the assembly authorized list 414 use assembly code, then the rule verifier 120 may determine that the assembly rule is verified. However, if the rule verifier 120 determines that at least one function 204 that is not included in the assembly authorized list 414 uses assembly code, then the rule verifier 120 may determine that the assembly rule is unverified.

Furthermore, while the examples above describe the rule verifier 120 using the assembly authorized list 414 that indicates the functions 204 that are authorized to use the assembly code, in other examples, the rule verifier 120 may perform similar processes using a file (e.g., an "assembly unauthorized file") that includes a list (e.g., an "assembly unauthorized list") of the functions 204 that are unauthorized to use the assembly code. For instance, the rule verifier 120 may analyze the call graph 112 and/or the user interface 302 using the assembly unauthorized file to determine whether any of the function(s) 204, that are included in the assembly unauthorized list, use assembly code. If the rule verifier 120 determines that none of the functions 204 that are included in the assembly unauthorized list use assembly code, then the rule verifier 120 may determine that the assembly rule is verified. However, if the rule verifier 120 determines that at least one function 204 that is included in the assembly unauthorized list uses assembly code, then the rule verifier 120 may determine that the assembly rule is unverified.

While the examples above describe five different rules that the rule verifier 120 may verify using the call graph 112 and/or the user interface 302, in other examples, the rule verifier 120 may verify additional and/or alternative rules using the call graph 112 and/or the user interface 302.

As further illustrated in the example of FIG. 1, the process 100 may include the rule verifier 120 outputting data representing verification results 124. In some examples, such as when the rule verifier 120 verifies the rules, the verification results 124 may include information indicating that the rules for the source code 102 has been verified. In some examples, such as when the rule verifier 120 does not verify one or more of the rules, the verification results 124 may include information indicating that the rules were unverified and/or may indicate which rule(s) was unverified. Additionally, in some examples, the output results may include information indicating the reason that one or more of the rules was unverified. For example, a first example, if the rule verifier 120 determined that the critical call rule was unverified, then the verification results 124 may indicate the function(s) 204 (e.g., the fourth function 204(4) from the example of FIG. 4A) that is making unauthorized external function calls. For a second example, if the rule verifier 120 determined that the prerequisite call rule was unverified, then the verification results 124 may indicate the function group (e.g., the call function and each prerequisite function) that caused the prerequisite rule to be unverified.

For a third example, if the rule verifier 120 determined that the sequence call rule was unverified, then the verification results 124 may indicate the sequence of functions that was unverified. For a fourth example, if the rule verifier 120 determined that the variable rule was unverified, then the verification results 124 may indicate the function(s) 204 (e.g., the fifth function 204(5) in the example of FIG. 4D) that caused the variable rule to be unverified. Still, for a fifth example, if the rule verifier 120 determined that the assembly rule was unverified, then the verification results 124 may indicate the function(s) 204 (e.g., the third function 204(3) in the example of FIG. 4E) that caused the assembly rule to be unverified.

In some examples, the rule verifier 120 outputs the verification results 124 by sending the verification results 124 to the client device 116. This way, the user(s) of the client device 116 is able to determine if the source code 102 has been verified and, if the source code 102 has been unverified, the reasons why the source code 102 is unverified. The user(s) may then use that information to update the source code 102 to fix any problems that exist with the source code 102. Additionally, after updating the source code 102, the process 100 may repeat using the updated source code 102 in order to determine whether the problems with the source code 102 were fixed by the updates. In some examples, the process 100 may then continue until the rule verifier 120 determines that the source code 102 is verified.

While the examples above describe verifying the rules using the call graph 112 and/or the user interface 302, in some examples, the process 100 may including performing additional and/or alternative processes using the call graph 112 and/or the user interface 302. For example, the process 100 may include sending the call graph 112 and/or the user interface 302 to the client device 116. The user(s) may then be able to view the call graph 112 and/or the user interface 302, using the client device 116, to identify information about the source code 102 for the software. For example, the user(s) may use the call graph 112 and/or the user interface 302 to identify the relationships between the functions 204, identify which functions 204 are internal to the software, identify which functions 204 are external to the software, identify the direct function calls 206 between the functions 204, identify the pointer function calls 206 between the functions 204, identify which functions 204 use global variables, identify which functions 204 use static variables, identify which functions 204 use assembly code, and/or identify any other information about the source code 102 for the software.

Additionally, the examples herein describe using files to generate the call graph 112 and/or verify rules. As described herein, a format for a file may include, but is not limited to, a JavaScript Object Notation (JSON) file, an Extensible Markup Language (XML) file, a YAML file, a B SON file, and/or any other format of file.

Figure 5:
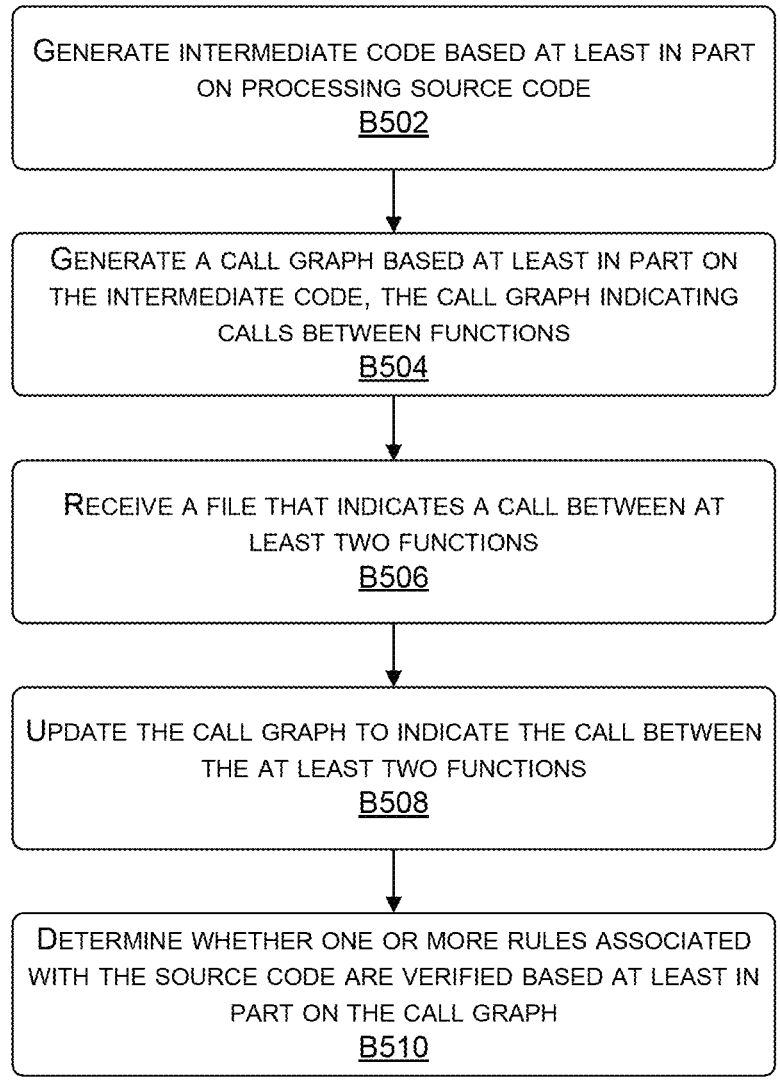
FIG. 5 is a flow diagram showing a method for performing software code verification, in accordance with some embodiments of the present disclosure.
Figure 6:
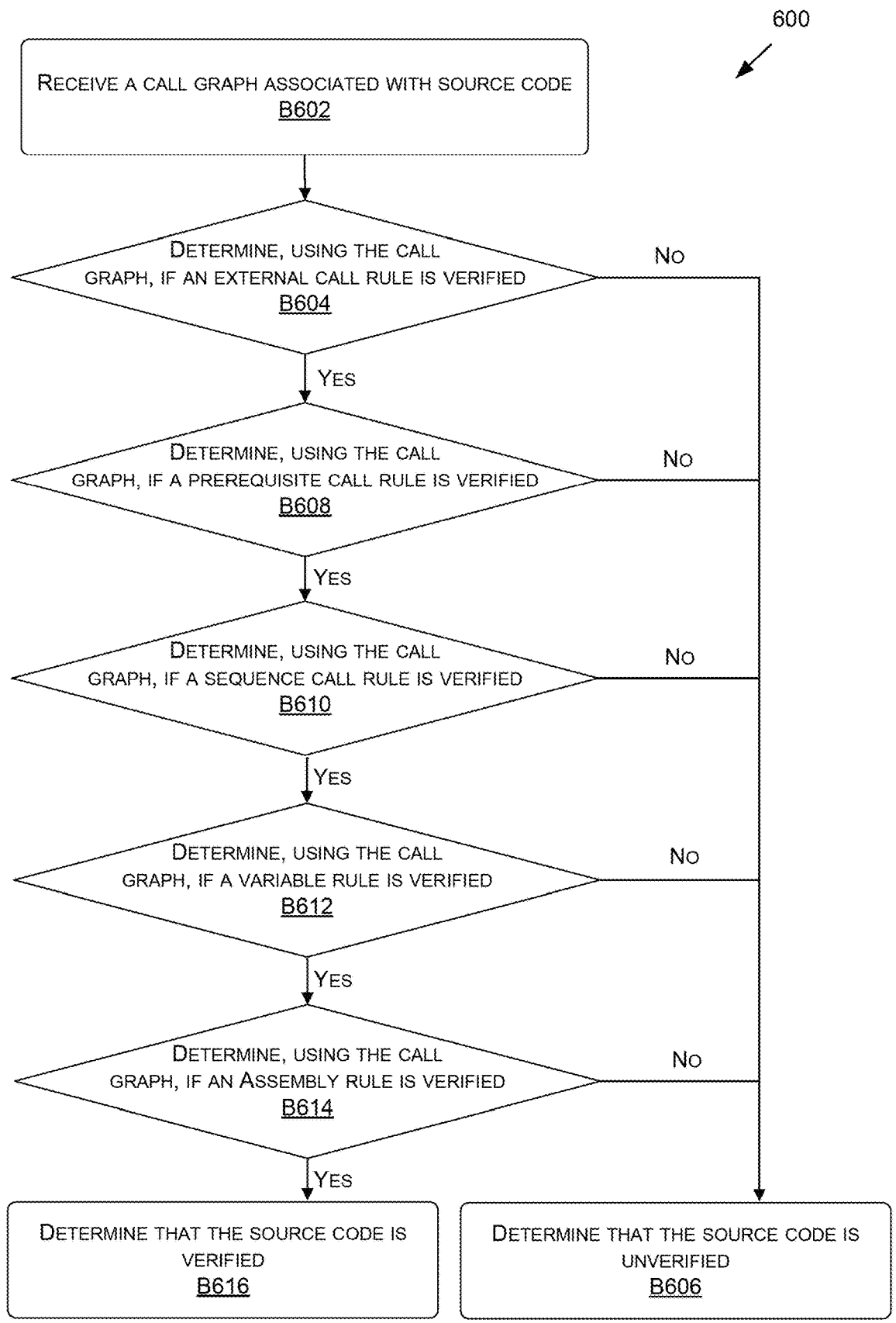
FIG. 6 is a flow diagram showing a method for verifying rules associated with software using a call graph, in accordance with some embodiments of the present disclosure.

Now referring to FIGS. 5 and 6, each block of methods 500 and 600, described herein, comprises a computing process that may be performed using any combination of hardware, firmware, and/or software. For instance, various functions may be carried out by a processor executing instructions stored in memory. The methods 500 and 600 may also be embodied as computer-usable instructions stored on computer storage media. The methods 500 and 600 may be provided by a standalone application, a service or hosted service (standalone or in combination with another hosted service), or a plug-in to another product, to name a few. In addition, methods 500 and 600 are described, by way of example, with respect to FIGS. 1-2B. However, these methods 500 and 600 may additionally or alternatively be executed by any one system, or any combination of systems, including, but not limited to, those described herein.

FIG. 5 is a flow diagram showing a method 500 for performing source code verification, in accordance with some embodiments of the present disclosure. The method 500, at block B502, includes generating intermediate code based at least in part on processing source code. For instance, the compiler 106 may generate the intermediate code 108 by processing the source code 102 for software. As described herein, an intermediate language, associated with the intermediate code 108, may indicate the functions 204 represented by the source code 102 as well as the calls that each of the functions 204 make to other functions 204. In some examples, the intermediate language may further indicate register information, such as variables (e.g., static variables, global variables, etc.) used by the functions 204, assembly code used by the functions 204, and/or other information. In some examples, the intermediate language is represented in files, where each file indicates the calls made by a function 204 and/or the register information associated with the function 204. In some examples, the intermediate language is again represented in a file(s), but where each file indicates the calls made by multiple functions 204 and/or the register information associated with the multiple functions 204.

The method 500, at block B504, includes generating a call graph based at least in part on the intermediate code, the call graph indicating calls between the functions. For instance, the graph generator 110 may generate the call graph 112 using the intermediate code 108. As described herein, the call graph 112 may include the nodes 202, where the nodes 202 of the call graph 112 represent the functions 204. Additionally, the calls 206 between the functions 204 may be represented as connections (e.g., arrows) between the nodes 202 within the call graph 112. Furthermore, in some examples, the call graph 112 may indicate the register information for the functions 204, such as which of the functions 204 use global variables, which of the functions 204 use static variables, and which of the functions 204 use assembly code.

The method 500, at block B506, includes receiving a file that indicates a call between at least two functions. For instance, the graph generator 110 may analyze the call graph 112, using one or more of the processes described herein, to identify that at least a function 204 includes a pointer function call with another function 204. As such, the graph generator 110 may generate the pointer function call request 114 that indicates the function 204, a value of a variable associated with the pointer function call, an address associated with the function pointer call, and/or any other information. The graph generator 110 may then provide the pointer function call request 114 to the user(s) of the software, such as by having the client device 116 display the pointer function call request 114. In response, the graph generator 110 may receive the pointer function call file 118 that maps the variable associated with the pointer function call to another function 204.

The method 500, at block B508, includes updating the call graph to indicate the call between the at least two functions. For instance, the graph generator 110 may use the pointer function call file 118 to update the call graph 112 to indicate the pointer function call between the two functions 204. In some examples, updating the call graph 112 may include adding a connection between the two functions 204, such as an arrow, that indicates the function pointer call. This way, the call graph 112 indicates both the direct function calls as well as the pointer function calls between the functions 204.

The method 500, at block B510, includes determining whether one or more rules associated with the source code are verified based at least in part on the call graph. For instance, the rule verifier 120 may analyze the call graph 112 (and/or the user interface 302) to determine whether the one or more rules are verified, which is described herein at least with respect to FIG. 6. As described herein, the rule verifier 120 may determine the one or more rules using at least the design specifications 104 for the software and/or the certification standards 122. The rule verifier 120 may then generate and output the verification results 124 indicating at least whether the one or more rules were verified.

Now referring to FIG. 6, FIG. 6 is a flow diagram showing a method 600 for verifying rules associated with software using a call graph, in accordance with some embodiments of the present disclosure. The method 600, at block B602, includes receiving a call graph associated with source code. For instance, the rule verifier 120 may receive the call graph 112 associated with the source code 102. As described herein, the call graph 112 may include the nodes 202, where the nodes 202 of the call graph 112 represent the functions 204. Additionally, the calls 206 between the functions 204 may be represented as connections (e.g., arrows) between the nodes 202 within the call graph 112. Furthermore, in some examples, the call graph 112 may indicate the register information for the functions 204, such as which of the functions 204 use global variables, which of the functions 204 use static variables, and which of the functions 204 use assembly code.

The method 600, at block B604, may include determining, using the call graph, if an external call rule is verified. For instance, the rule verifier 120 may use the call graph 112 (and/or the information from the user interface 302) to determine whether the external call rule is verified. As described herein, to verify the external call rule using the call graph 112, the rule verifier 120 initially uses an external call list to determine each of the functions 204 that are allowed to make external function calls. The rule verifier 120 then analyzes the call graph 112 using the external call list in order to determine whether any function(s) 204 that is not included in the external call list makes an external function call. If the rule verifier 120 determines that only the functions 204 that are included in the external call list make the external function calls, then the rule verifier 120 may determine that the external call rule is verified. However, if the rule verifier 120 determines that a function(s) 204 that is not included in the external call list makes an external function call, then the rule verifier 120 may determine that the external call rule is unverified.

If, at block B604, it is determined that the external call rule is unverified (e.g., No), then the method 600, at block B606, may include determining that the source code is unverified. For instance, if the rule verifier 120 determines that the external call rule is unverified, such that at least one function 204 that is unauthorized to make an external function call does make an external function call, then the rule verifier 120 may determine that the source code 102 is unverified. In some examples, the rule verifier 120 may also generate the verification results 124 to indicate that the source code 102 is unverified, the external call rule is unverified, and/or the function(s) 204 that caused the external call rule to be unverified.

However, if, at block B604, it is determined that the external call rule is verified (e.g., Yes), then the method 600, at block B608, may include determining, using the call graph, if a prerequisite call rule is verified. For instance, the rule verifier 120 may use the call graph 112 (and/or the information from the user interface 302) to determine whether the prerequisite call rule is verified. As described herein, to verify this prerequisite call rule for a caller function 204, the rule verifier 120 may analyze the call graph 112 to determine whether the caller function 204 includes common ancestor(s) with each prerequisite function 204. If the rule verifier 120 determines that the caller function 204 includes a common ancestor(s) with each prerequisite function 204, then the rule verifier 120 may determine that the prerequisite call rule is verified for the caller function 204. However, if the rule verifier 120 determines that the caller function 204 does not include a common ancestor(s) with each prerequisite function 204, then the rule verifier 120 may determine that the prerequisite call rule is unverified for the caller function 204.

If, at block B608, it is determined that the prerequisite call rule is unverified (e.g., No), then the method 600, at block B606, may again include determining that the source code is unverified. For instance, if the rule verifier 120 determines that the prerequisite call rule is unverified, such that at least one caller function 204 does not include a common ancestor with at least one prerequisite function 204, then the rule verifier 120 may determine that the source code 102 is unverified. In some examples, the rule verifier 120 may also generate the verification results 124 to indicate that the source code 102 is unverified, the prerequisite call rule is unverified, and/or the function(s) 204 that caused the prerequisite call rule to be unverified.

However, if, at block B608, it is determined that the prerequisite call rule is verified (e.g., Yes), then the method 600, at block B610, may include determining, using the call graph, if a sequence call rule is verified. For instance, the rule verifier 120 may use the call graph 112 (and/or the information from the user interface 302) to determine whether the sequence call rule is verified. As described herein, the rule verifier 120 may verify the sequence call rule based on determining that the source code 102 follows the design descriptions for the software. To verify the sequence call rule for a sequence of the functions 204, the rule verifier 120 may determine whether the functions 204 are called in an order that matches the sequence as specified by the design descriptions. If the rule verifier 120 determines that the functions 204 are called in the sequence that is specified by the design descriptions, then the rule verifier 120 may determine that the sequence call rule for that design descriptions is verified. However, if the rule verifier 120 determines that the functions 204 are not called in the sequence that is specified by the design descriptions, then the rule verifier 120 may determine that the sequence call rule for that design descriptions is unverified.

If, at block B610, it is determined that the sequence call rule is unverified (e.g., No), then the method 600, at block B606, may again include determining that the source code is unverified. For instance, if the rule verifier 120 determines that the sequence call rule is unverified, such that at least one order of the functions 204 does not match the sequence as indicated by the design descriptions, then the rule verifier 120 may determine that the source code 102 is unverified. In some examples, the rule verifier 120 may also generate the verification results 124 to indicate that the source code 102 is unverified, the sequence call rule is unverified, and/or the sequence of the function(s) 204 that caused the sequence call rule to be unverified.

However, if, at block B610, it is determined that the sequence call rule is verified (e.g., Yes), then the method 600, at block B612, may include determining, using the call graph, if a variable rule is verified. For instance, the rule verifier 120 may use the call graph 112 (and/or the information from the user interface 302) to determine whether the variable rule is verified. As described herein, to verify the variable rule, the rule verifier 120 determines each of the functions 204 that are authorized to use global variables and/or static variables and/or determines each of the functions 204 that are unauthorized to use global variables and/or static variables. The rule verifier 120 then analyzes the call graph 112 to determine whether any function(s) 204 that is unauthorized to use global variables and/or static variables do in fact use global variables and/or static variables. If the rule verifier 120 determines that only the functions 204 that are authorized to use global variables and/or static variables do in fact use the global variables and/or static variables, then the rule verifier 120 may determine that the variable rule is verified. However, if the rule verifier 120 determines that at least one function 204 that is unauthorized to use global variables and/or static variables does in fact use the global variables and/or static variables, then the rule verifier 120 may determine that the variable rule is unverified.

If, at block B612, it is determined that the variable rule is unverified (e.g., No), then the method 600, at block B606, may again include determining that the source code is unverified. For instance, if the rule verifier 120 determines that the variable rule is unverified, such that at least one of the functions 204 that is unauthorized to use global variables and/or static variables does in fact use the global variables and/or static variables, then the rule verifier 120 may determine that the source code 102 is unverified. In some examples, the rule verifier 120 may also generate the verification results 124 to indicate that the source code 102 is unverified, the variable rule is unverified, and/or the function(s) 204 that caused the variable rule to be unverified.

However, if, at block B612, it is determined that the variable rule is verified (e.g., Yes), then the method 600, at block B614, may include determining, using the call graph, if an assembly rule is verified. For instance, the rule verifier 120 may use the call graph 112 (and/or the information from the user interface 302) to determine whether the assembly rule is verified. As described herein, to verify the assembly rule, the rule verifier 120 determines each of the functions 204 that are authorized to use assembly code and/or determines each of the functions 204 that are unauthorized to use assembly code. The rule verifier 120 then analyzes the call graph 112 to determine whether any function(s) 204 that is unauthorized to use assembly code does in fact use the assembly code. If the rule verifier 120 determines that only the functions 204 that are authorized to use assembly code do in fact use the assembly code, then the rule verifier 120 may determine that the assembly rule is verified. However, if the rule verifier 120 determines that at least one function 204 that is unauthorized to use assembly code does in fact use the assembly code, then the rule verifier 120 may determine that the assembly rule is unverified.

If, at block B614, it is determined that the assembly rule is unverified (e.g., No), then the method 600, at block B606, may again include determining that the source code is unverified. For instance, if the rule verifier 120 determines that the assembly rule is unverified, such that at least one of the functions 204 that is unauthorized to use assembly code does in fact use the assembly code, then the rule verifier 120 may determine that the source code 102 is unverified. In some examples, the rule verifier 120 may also generate the verification results 124 to indicate that the source code 102 is unverified, the assembly rule is unverified, and/or the function(s) 204 that caused the assembly rule to be unverified.

However, if, at block B614, it is determined that the assembly rule is verified (e.g., Yes), then the method 600, at block B616, may include determining that the source code is verified. For instance, if the rule verifier 120 determines that all of the rules are verified, then the rule verifier 120 may determine that the source code 102 is verified. In some examples, the rule verifier 120 may then generate the verification results 124 to indicate that the source code 102 is verified.

While the example of FIG. 6 illustrates the method 600 as verifying five different rules, in other examples, the method 600 may not include verifying one or more of the rules (e.g., the method 600 may not include one or more of blocks B604, B608, B610, B612, or B614). Additionally, in other examples, the method 600 may include verifying additional and/or alternative rules. Furthermore, in some examples, the method 600 may include a different order for the blocks B604, B608, B610, B612, or B614 and/or may include performing one or more of the blocks B604, B608, B610, B612, or B614 sequentially. For example, in some embodiments, blocks B604, B608, B610, B612, or B614 may only be performed dependent on the outcome of one or more of the other blocks B604, B608, B610, B612, or B614. As another example, in some embodiments, blocks B604, B608, B610, B612, or B614 may be performed independent of any other of the blocks B604, B608, B610, B612, or B614. In such an example, and in embodiments, two or more of the blocks B604, B608, B610, B612, or B614 may be performed in parallel.

Example Computing Device

Figure 7:
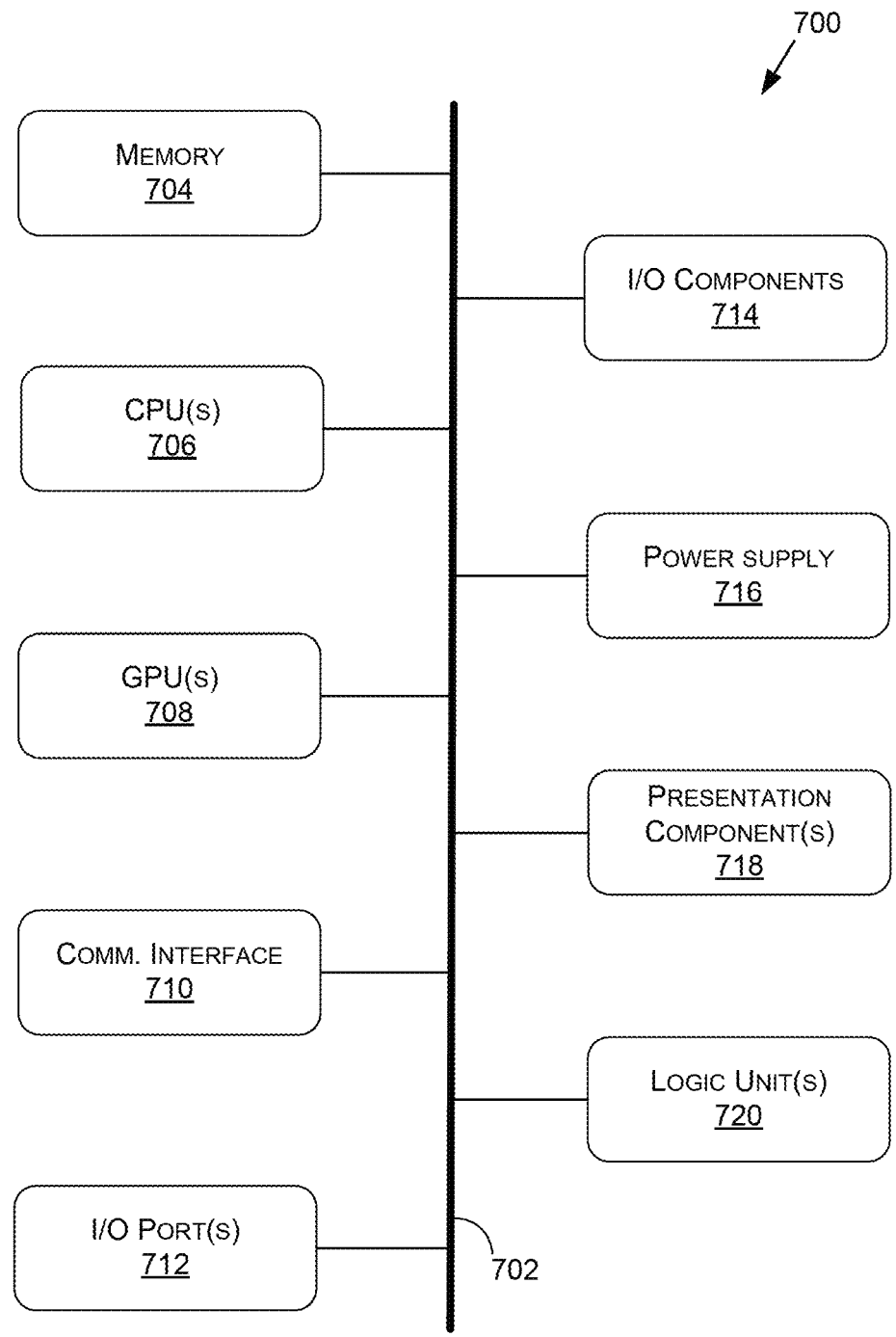
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
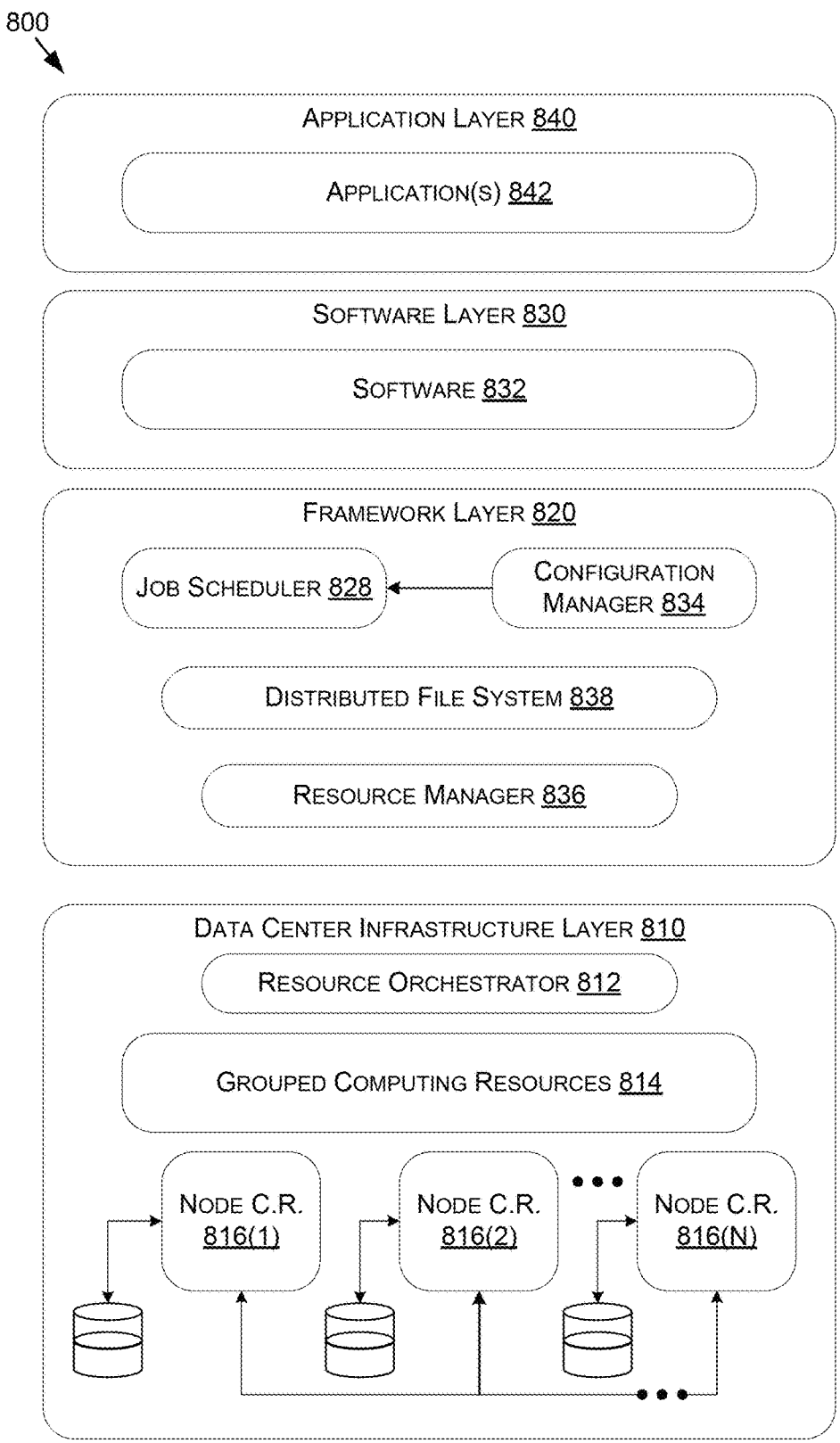
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) (e.g., the client device 116) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating, based at least on source code, a call graph comprising a plurality of nodes that represent functions of the source code;
   determining, based on at least one of the source code or the call graph, that a first function of the functions is associated with a function pointer;
   receiving, based at least on the first function being associated with the function pointer, a file indicating that a second function of the functions is associated with the function pointer;
   updating, based at least on the file, the call graph to generate an updated call graph including an indication of a pointer call between the first function and the second function; and
   determining whether a rule associated with the source code is verified based at least on the updated call graph.

2. The method of claim 1, further comprising:
   sending a request to identify the second function that is associated with the function pointer,
   wherein the file is received based at least on the sending of the request.

3. The method of claim 1, further comprising:
   receiving a list of external function calls that a function is authorized to make,
   wherein the determining whether the rule is verified comprises:
      determining, based at least on the updated call graph, that the function is making an external function call that is not included in the list of external function calls; and
      determining that the rule is not verified based at least on the function making the external function call.

4. The method of claim 1, further comprising:
   receiving an indication that a third function of the functions is to be called after a fourth function of the functions,
   wherein the determining whether the rule is verified comprises:
      determining, based at least on the updated call graph, that the third function includes a first relationship with a fifth function of the functions;
      determining, based at least on the updated call graph, that the fourth function includes a second relationship with the fifth function; and
      determining that the rule is verified based at least on the third function having the first relationship with the fifth function and the fourth function having the second relationship with the fifth function.

5. The method of claim 1, further comprising:
   receiving an indication of a sequence that includes a third function of the functions calling a fourth function of the functions followed by the fourth function calling a fifth function of the functions;
   wherein the determining whether the rule is verified comprises:
      determining, based at least on the updated call graph, that the third function includes a first call with the fourth function;
      determining, based at least on the updated call graph, that the fourth function includes a second call, after the first call, with the fifth function; and
      determining that the rule is verified based at least on the fourth function including the second call, after the first call, with the fifth function.

6. The method of claim 1, further comprising:
   receiving a list of functions authorized to use one or more global variables,
   wherein the determining whether the rule is verified comprises:
      determining, based at least on the updated call graph, that a function not included in the list of functions uses a global variable of the one or more global variables; and
      determining that the rule is not verified based at least on the function using the global variable.

7. The method of claim 1, further comprising:
   receiving a list of functions authorized to use assembly code,
   wherein the determining whether the rule is verified comprises:
      determining, based at least on the updated call graph, that a function not included in the list of functions uses the assembly code; and
      determining that the rule is not verified based at least on the function using the assembly code.

8. The method of claim 1, wherein one or more first nodes that represent one or more internal functions from the functions include a first characteristic and one or more second nodes that represent one or more external functions from the functions include a second characteristic, the second characteristic being different from the first characteristic.

9. The method of claim 1, wherein one or more first connectors that represent one or more direct calls include a first characteristic and one or more second connectors that represent one or more pointer function calls include a second characteristic, the second characteristic being different from the first characteristic.

10. The method of claim 1, further comprising:
    receiving design specifications for software associated with the source code; and
    determining the rule based at least on the design specifications.

11. A processor comprising:
processing circuitry to:
  generate, based at least on source code associated with software, a call graph that represents one or more direct calls between functions of the software;
  determine, based at least on at least one of the source code or the call graph, that a first function of the functions is associated with a pointer call;
  receive, based on the first function being associated with the pointer call, a file that includes an indication that a second function of the functions is associated with the pointer call; and
  update, based at least on the file, the call graph to generate an updated call graph that indicates the pointer call between the first function and the second function.

12. The processor of claim 11, wherein the processing circuitry is further to:
  send a request to identify the second function that is associated with the pointer call,
  wherein the file is received is based at least on the request being sent.

13. The processor of claim 11, wherein the processing circuitry is further to determine whether one or more rules associated with the source code are verified based at least on the updated call graph.

14. The processor of claim 13, wherein the processing circuitry is further to:
  receive a list of functions authorized to make external function calls,
  wherein the determination of whether the one or more rules are verified comprises:
    determining, based at least on the updated call graph, that one or more functions included in the list of functions make one or more external function calls; and
    determining that a rule of the one or more rules is verified based at least on the one or more functions making the one or more external function calls.

15. The processor of claim 13, wherein the processing circuitry is further to:
  receive an indication that the first function of the functions is to be called after the second function of the functions,
  wherein the determination of whether the one or more rules are verified comprises:
    determining, based at least on the updated call graph, that the first function includes a first relationship with a third function of the functions;
    determining, based at least on the updated call graph, that the second function includes a second relationship with the third function; and
    determining that a rule of the one or more rules is verified based at least on the first function having the first relationship with the third function and the second function having the second relationship with the third function.

16. The processor of claim 13, wherein the processing circuitry is further to:
  receive an indication of a sequence that includes a third function of the functions calling a fourth function of the functions followed by the fourth function calling a fifth function of the functions;
  wherein the determination of whether the one or more rules are verified comprises:
    determining, based at least on the updated call graph, that the third function includes a first call with the fourth function;
    determining, based at least on the updated call graph, that the fourth function includes a second call, after the first call, with the fifth function; and
    determining that a rule of the one or more rules is verified based at least in part on the fourth function including the second call, after the first call, with the fifth function.

17. The processor of claim 13, wherein the processing circuitry is further to:
  receive a list of functions authorized to use global variables,
  wherein the determination of whether the one or more rules are verified comprises:
    determining, based at least on the updated call graph, that a third function not included in the list of functions uses a global variable; and
    determining that a rule of the one or more rules is not verified based at least on the third function using the global variable.

18. The processor of claim 11, wherein the processor is comprised in at least one of:
  a control system for an autonomous or semi-autonomous machine;
  a perception system for an autonomous or semi-autonomous machine;
  a system for performing simulation operations;
  a system for performing digital twin operations;
  a system for performing light transport simulation;
  a system for performing collaborative content creation for 3D assets;
  a system for performing deep learning operations;
  a system implemented using an edge device;
  a system implemented using a robot;
  a system for performing conversational AI operations;
  a system for generating synthetic data;
  a system incorporating one or more virtual machines (VMs);
  a system implemented at least partially in a data center; or
  a system implemented at least partially using cloud computing resources.

19. A system comprising:
one or more processors:
  generate, based at least on source code associated with software, a call graph that represents one or more direct calls between functions of the software;
  determine, based at least on at least one of the source code or the call graph, that a first function of the functions is associated with a pointer call;
  obtain, based on the first function being associated with the pointer call, a file that includes an indication that a second function of the functions is associated with the pointer call; and
  update, based at least on the file, the call graph to generate an updated call graph that indicates the pointer call between the first function and the second function.

20. The system of claim 19, wherein the system is comprised in at least one of:
  a control system for an autonomous or semi-autonomous machine;
  a perception system for an autonomous or semi-autonomous machine;
  a system for performing simulation operations;
  a system for performing digital twin operations;

a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *